US011481174B2

(12) United States Patent  
Kwon et al.

(10) Patent No.: US 11,481,174 B2  
(45) Date of Patent: Oct. 25, 2022

(54) ELECTRONIC DEVICE AND METHOD FOR CONTROLLING AND OPERATING FOLDABLE DISPLAY

(71) Applicant: SAMSUNG ELECTRONICS CO., LTD., Suwon-si (KR)

(72) Inventors: Sungwook Kwon, Suwon-si (KR); Nanhee Kim, Suwon-si (KR); Seungeun Lee, Suwon-si (KR); Jungeun Lee, Suwon-si (KR); Youngchan Cho, Suwon-si (KR); Dugjin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/840,678

(22) Filed: Apr. 6, 2020

(65) Prior Publication Data

US 2020/0326900 A1  Oct. 15, 2020

(30) Foreign Application Priority Data

Apr. 9, 2019  (KR) ......................... 10-2019-0041310

(51) Int. Cl.
*G06F 3/0482* (2013.01)
*G06F 3/14* (2006.01)
(Continued)

(52) U.S. Cl.
CPC .......... *G06F 3/1446* (2013.01); *G06F 1/1616* (2013.01); *G06F 1/1647* (2013.01);
(Continued)

(58) Field of Classification Search
CPC .... G06F 1/1616; G06F 1/1618; G06F 1/1641; G06F 1/1647; G06F 1/165; G06F 3/1423;
(Continued)

(56) References Cited

U.S. PATENT DOCUMENTS 6,983,331 B1 * 1/2006 Mitchell ................. H04L 67/06  
    709/246  
7,196,676 B2 * 3/2007 Nakamura ............ G06F 3/1423  
    345/1.1  
(Continued)

OTHER PUBLICATIONS

International Search Report and Written Opinion dated Jul. 13, 2020 in counterpart International Patent Application No. PCT/KR2020/004562.

(Continued)

*Primary Examiner* — Alvin H Tan  
(74) *Attorney, Agent, or Firm* — Nixon & Vanderhye P.C.

(57) ABSTRACT

In embodiments, an electronic device includes: a foldable housing that includes a hinge, a first housing connected to the hinge, the first housing having a first surface facing a first direction and a second surface facing a second direction opposite the first direction, and a second housing connected to the hinge and configured to be foldable with the first housing around the hinge, the second housing having a third surface facing a third direction and a fourth surface facing a fourth direction opposite the third direction. The first surface faces the third surface in a folded state, and the third direction is equal to the first direction in an unfolded state. The electronic device further includes a first display extending from the first surface to the third surface to define the first and third surfaces, a second display viewable through at least a part of the second or fourth surface, at least one sensor, a processor disposed in the first or second housing structure, and a memory operatively connected to the processor. The memory stores instructions which, when executed, cause the processor to control the electronic device to display a plurality of applications on the first display in the unfolded state, to select at least one of the plurality of applications, based on an input or priorities of the plurality of applications, based on the at least one sensor (Continued)

detecting that the foldable housing is changed from the unfolded state to the folded state, and to display the selected application on the second display.

16 Claims, 26 Drawing Sheets

(51) Int. Cl.
*G06F 1/16* (2006.01)
*G06F 3/04886* (2022.01)

(52) U.S. Cl.
CPC .......... *G06F 1/1681* (2013.01); *G06F 3/0482* (2013.01); *G06F 3/04886* (2013.01); *G06F 2203/04803* (2013.01)

(58) Field of Classification Search
CPC ............... G06F 3/0482; G06F 3/04886; G06F 2203/04803; G06F 3/1446; G06F 1/1681
See application file for complete search history.

(56) References Cited

U.S. PATENT DOCUMENTS

| | | | |
|---|---|---|---|
| 9,021,375 B2 * | 4/2015 | Balasubramanian ... | G06F 9/451 715/772 |
| 9,164,540 B2 * | 10/2015 | Sirpal ................... | G06F 3/0488 |
| 9,274,552 B2 | 3/2016 | Ahn et al. | |
| 9,489,078 B2 * | 11/2016 | Seo ....................... | G06F 3/1431 |
| 9,560,189 B2 * | 1/2017 | Lee ........................ | G06F 1/1652 |
| 9,575,708 B2 * | 2/2017 | Park ...................... | G06F 1/1647 |
| 9,891,663 B2 * | 2/2018 | Park ...................... | G06F 3/0487 |
| 9,971,712 B2 * | 5/2018 | Oh ......................... | G06F 3/0487 |
| 10,114,418 B2 * | 10/2018 | Shin ....................... | G09G 5/005 |
| 10,133,310 B2 * | 11/2018 | Kim ...................... | G06F 1/1652 |
| 10,534,534 B2 * | 1/2020 | Cheong ................. | G06F 3/0488 |
| 10,866,694 B2 * | 12/2020 | Kim ...................... | G06F 3/0488 |
| 11,068,074 B2 * | 7/2021 | Lee ........................ | G09G 5/37 |
| 2013/0135182 A1 * | 5/2013 | Jung ..................... | G06F 3/0487 345/30 |
| 2014/0101576 A1 | 4/2014 | Kwak et al. | |
| 2014/0137041 A1 * | 5/2014 | Jeon ...................... | G06F 1/1652 715/815 |
| 2015/0067588 A1 * | 3/2015 | Shim ..................... | G06F 3/0481 715/790 |
| 2015/0338888 A1 | 11/2015 | Kim et al. | |
| 2016/0224211 A1 | 8/2016 | Xu et al. | |
| 2016/0372083 A1 * | 12/2016 | Taite ................... | G06F 3/04886 |
| 2017/0242538 A1 | 8/2017 | Chaudhri et al. | |
| 2018/0284844 A1 | 10/2018 | Jeune et al. | |
| 2018/0342226 A1 | 11/2018 | Shin et al. | |
| 2019/0018454 A1 | 1/2019 | Jung et al. | |
| 2019/0042066 A1 | 2/2019 | Kim et al. | |
| 2019/0187758 A1 | 6/2019 | Lee et al. | |
| 2021/0173533 A1 * | 6/2021 | Kim ................... | G06F 3/04817 |

OTHER PUBLICATIONS

Extended European Search Report dated Nov. 18, 2021 for EP Application No. 20788123.6.

* cited by examiner

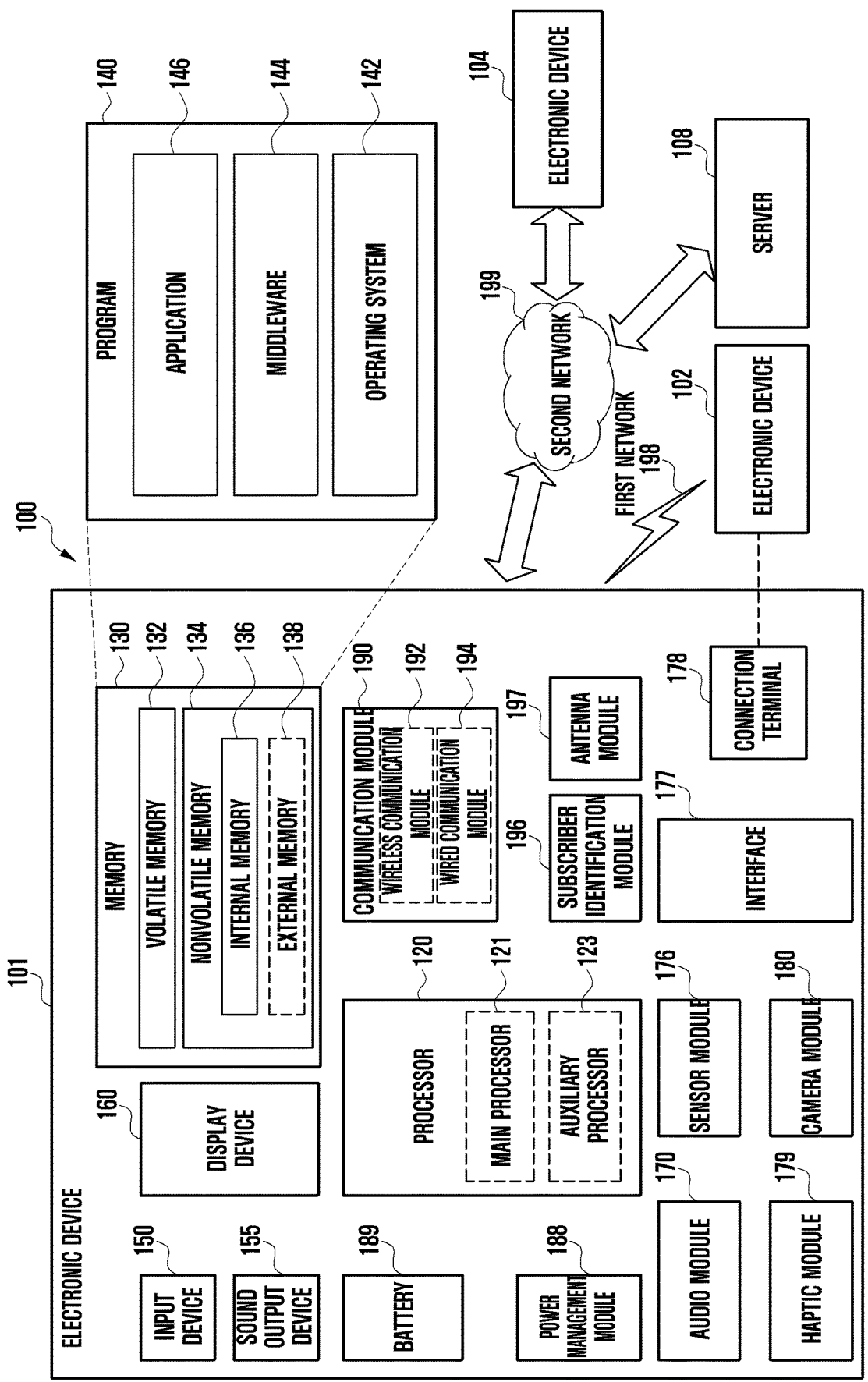

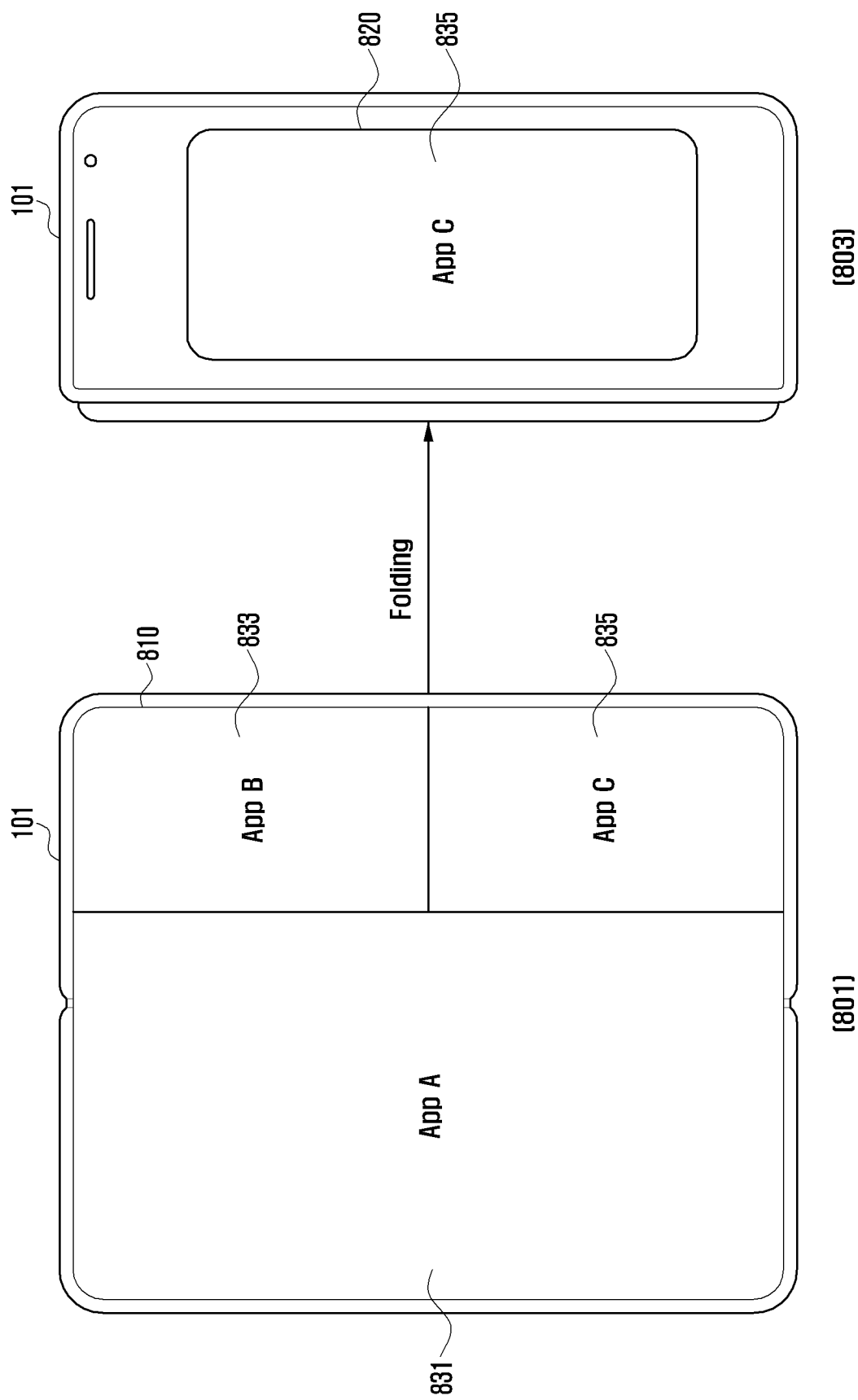

ELECTRONIC DEVICE AND METHOD FOR CONTROLLING AND OPERATING FOLDABLE DISPLAY

CROSS-REFERENCE TO RELATED APPLICATION

This application is based on and claims priority under 35 U.S.C. § 119 to Korean Patent Application No. 10-2019-0041310, filed on Apr. 9, 2019, in the Korean Intellectual Property Office, the disclosure of which is incorporated by reference herein in its entirety.

BACKGROUND

Field

The disclosure relates to an electronic device and a method for controlling and operating a foldable display.

Description of Related Art

With the growth of related technologies, electronic devices such as a smart phone have evolved to offer various essential or optional functions to users. In order for the user to easily access such functions, the electronic device includes a touch-sensitive display such as a touch screen and is capable of providing screens of various applications through the display.

Recently, in order to increase portability, a flexible display and, as a more improved form, a fully foldable display have been developed. The electronic device having such a foldable display can use a large display size in an unfolded state and also can reduce the entire volume thereof in a folded state. It is therefore possible to increase both usability and portability.

In addition, recent electronic devices may often include two or more separate displays such as a main display (e.g., a foldable display) and a sub display (e.g., a cover display). In this case, the electronic device is required to realize the continuity of an application between such displays. For example, when the electronic device is in an unfolded or open state, the application may be provided through the foldable display. On the other hand, when the electronic device is folded or closed, the application may be provided through the cover display.

However, the user may not always want to use the application continuously. Thus, providing the continuity of an application may cause the cover display to be unnecessarily turned on. Unfortunately, this may lead to power waste and user's inconvenience.

In addition, when a plurality of applications are displayed through the foldable display, providing the continuity of a certain application that is not of interest to the user may not be a desirable continuity provision.

SUMMARY

Embodiments of the disclosure provide an electronic device capable of effectively and reliably implementing the continuity of applications through two or more separate displays.

According to various example embodiments of the disclosure, an electronic device may include: a foldable housing including a hinge; a first housing connected to the hinge, the first housing including a first surface facing a first direction and a second surface facing a second direction opposite the first direction; and a second housing connected to the hinge and configured to be foldable with the first housing around the hinge, the second housing including a third surface facing a third direction and a fourth surface facing a fourth direction opposite the third direction, wherein the first surface faces the third surface in a folded state, and the third direction is equal to the first direction in an unfolded state. The electronic device may further include a first display extending from the first surface to the third surface defining the first and third surfaces; a second display viewable through at least a part of the second or fourth surface; at least one sensor; a processor disposed in the first housing structure or the second housing structure; and a memory operatively connected to the processor, wherein the memory stores instructions that, when executed, cause the processor to control the electronic device to: display a plurality of applications on the first display in an unfolded state, to select at least one of the plurality of applications based on an input or priorities of the plurality of applications based on the at least one sensor detecting that the foldable housing is changed from the unfolded state to the folded state, and to display the selected application on the second display.

According to various example embodiments of the disclosure, a method for controlling and operating a plurality of displays of an electronic device including a foldable housing may include: displaying a plurality of applications on a first display in an unfolded state; selecting at least one of the plurality of applications, based on an input or priorities of the plurality of applications, based on at least one sensor detecting that the foldable housing is changed from the unfolded state to a folded state; and displaying the selected application on a second display.

According to various example embodiments of the disclosure, an electronic device may include: a first display capable of changing a display configuration; a second display; at least one sensor; and a processor configured to control the electronic device to: display at least one application through the first display in a state where the display is a first configuration, to identify a change of the display configuration through the at least one sensor, to detect a predefined input within a predetermined time from a time point at which the display configuration is changed to a second configuration, and to display the at least one application through the second display based on the predefined input.

According to various example embodiments of the disclosure, it is possible to improve a user experience by providing continuity for a specific application of interest to the user. It is also possible to prevent and/or reduce unnecessary power consumption by providing an application continuity or maintaining a display power off state in consideration of a user's intention. Further, various example embodiments of the disclosure are effective in preventing and/or reducing malfunction of the electronic device, preventing and/or reducing user confusion, and maintaining security.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 1 is a block diagram illustrating an example electronic device in a network environment according to various embodiments;

FIG. 8A is a diagram illustrating an example method for controlling and operating a display of an electronic device according to various embodiments;

DETAILED DESCRIPTION

Figure 2A:
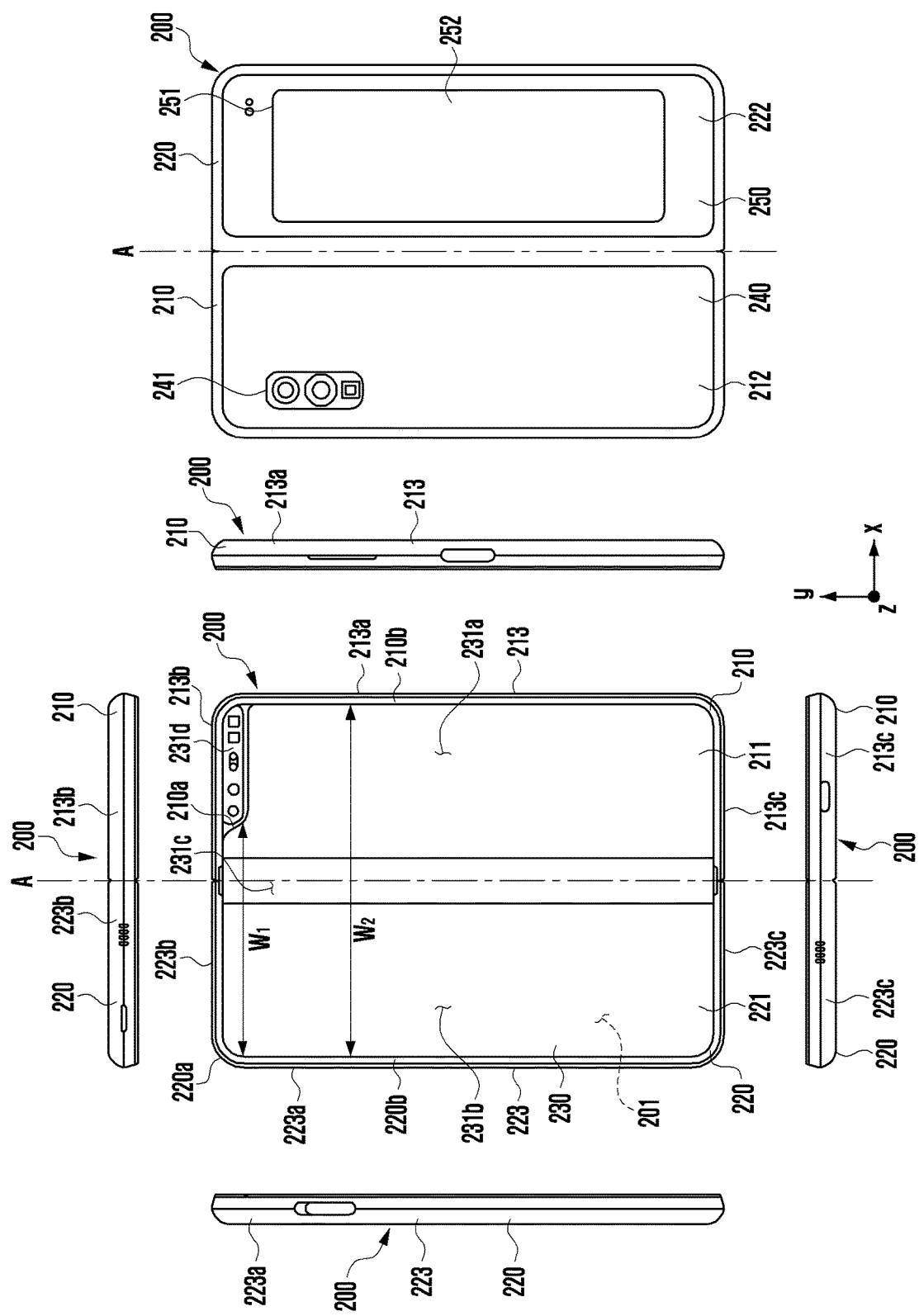
FIG. 2A is a diagram illustrating an example electronic device in an unfolded state according to various embodiments.

Various example embodiments of the disclosure will be described in greater detail below with reference to the accompanying drawings.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may include various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 2A is a diagram illustrating an example electronic device in an unfolded state according to various embodiments.

According to various embodiments, the electronic device 200 (e.g., the electronic device 101 in FIG. 1) may include a first display and a second display which are separated from each other. The first display may be foldable, and the second display may be non-foldable.

Referring to FIG. 2A, the electronic device 200 may include a pair of housing structures 210 and 220 that are rotatably combined with each other through a hinge structure (e.g., a hinge structure 264 in FIG. 3), a hinge cover 265 (see, e.g., FIG. 2B) that covers a foldable portion of the pair of housing structures 210 and 220, and a main display 230 (e.g., a flexible display or a foldable display, hereinafter referred to as a first display) that is disposed in a space formed by the pair of housing structures 210 and 220. The first display 230 may include a single display or two or more displays. In the disclosure, a surface on which the first display 230 is disposed is defined as a front surface (or a first surface) of the electronic device 200, and the opposite surface of the front surface is defined as a rear surface (or a second surface) of the electronic device 200. Also, a surface laterally surrounding a space between the front and rear surfaces is defined as a lateral surface of the electronic device 200.

In an embodiment, the pair of housing structures 210 and 220 may include a first housing structure 210 having a sensor area 231d, a second housing structure 220, a first rear cover 240, and a second rear cover 250. The pair of housing structures 210 and 220 of the electronic device 200 is not limited to the shape and configuration shown in FIGS. 2A and 2B, and may be implemented with any other shape and configuration. For example, in another embodiment, the first housing structure 210 and the first rear cover 240 may be integrally formed, and also the second housing structure 220 and the second rear cover 250 may be integrally formed.

In an embodiment, the first housing structure 210 and the second housing structure 220 are disposed at both sides with respect to a folding axis (indicated by 'A') and may have a generally symmetric shape with respect to the folding axis (A). As will be described later, the first and second housing structures 210 and 220 may have different angles or distances therebetween, depending on whether the electronic device 200 is in an unfolded state (also referred to as an open state), a folded state (also referred to as a closed state), or an intermediate state. In the illustrated embodiment, contrary to the second housing structure 220, the first housing structure 210 has the sensor area 231d in which various sensors are disposed. Excepting this, both housing structures may be symmetrical in shape. In another embodiment, the sensor area 231d may be alternatively or additionally disposed in the second housing structure 220.

In an embodiment, the first housing structure 210 is connected to the hinge structure (e.g., the hinge structure 264 in FIG. 3) and may include a first surface 211 partially forming the front surface of the electronic device 200 and facing in a first direction, a second surface 212 partially forming the rear surface of the electronic device 200 and facing in a second direction opposite to the first direction, and a first lateral member 213 partially surrounding a space between the first surface 211 and the second surface 212. In an embodiment, the first lateral member 213 may include a first lateral surface 213a disposed in parallel with the folding axis (A), a second lateral surface 213b extended perpendicularly to the folding axis (A) from one end of the first lateral surface 213a, and a third lateral surface 213c extended perpendicularly to the folding axis (A) from the other end of the first lateral surface 213a.

In an embodiment, the second housing structure 220 is connected to the hinge structure (e.g., the hinge structure 264 in FIG. 3) and may include a third surface 221 partially forming the front surface of the electronic device 200 and facing in a third direction, a four surface 222 partially forming the rear surface of the electronic device 200 and facing in a fourth direction opposite to the third direction, and a second lateral member 223 partially surrounding a space between the third surface 221 and the fourth surface 222. In an embodiment, the second lateral member 213 may include a fourth lateral surface 223a disposed in parallel with the folding axis (A), a fifth lateral surface 223b extended perpendicularly to the folding axis (A) from one end of the fourth lateral surface 223a, and a sixth lateral surface 223c extended perpendicularly to the folding axis (A) from the other end of the fourth lateral surface 223a. In the folded state, the first surface 211 and the third surface 221 may face each other. In the unfolded state, the first direction and the third direction are equal to each other.

In an embodiment, the electronic device 200 may include a recess 201 formed through a structural shape coupling of the first and second housing structures 210 and 220 to accommodate the first display 230 therein. The recess 201 may have the substantially same size as the first display 230. In an embodiment, the recess 201 may have two or more different widths in a direction perpendicular to the folding axis (A) because of the sensor area 231d. For example, the recess 201 may have a first width (w1) between a first portion 220a of the second housing structure 220 parallel to the folding axis (A) and a first portion 210a of the first housing structure 210 formed at one edge of the sensor area 231d, and a second width (w2) between a second portion 220b of the second housing structure 220 parallel to the folding axis (A) and a second portion 210b of the first housing structure 210 not corresponding to the sensor area 231d and being parallel to the folding axis (A). In this case, the second width (w2) may be greater than the first width (w1). That is, the first portion 210a of the first housing structure 210 and the first portion 220a of the second housing structure 220, which have asymmetrical shapes, form the first width (w1) of the recess 201, whereas the second portion 210b of the first housing structure 210 and the second portion 220b of the second housing structure 220, which have symmetrical shapes, form the second width (w2) of the recess 201. In an embodiment, the first portion 210a and the second portion 210b of the first housing structure 210 may have different distances from the folding axis (A). The width of the recess 201 is not limited to the illustrated example. In various embodiments, the recess 201 may have two or more different widths depending on the shape of the sensor area 231d or asymmetrical shapes of the first and second housing structures 210 and 220.

In an embodiment, at least a portion of the first and second housing structures 210 and 220 may be formed of a metallic or non-metallic material having a selected rigidity value to support the first display 230.

In an embodiment, the sensor area 231d may be formed to occupy a certain region adjacent to one corner of the first housing structure 210. The arrangement, shape, and size of the sensor area 231d are not limited to the illustrated example. In another embodiment, the sensor area 231d may be formed at any other corner of the first housing structure 210 or at any position between top and bottom corners. In still another embodiment, the sensor area 231*d* may be formed in a portion of the second housing structure 220. In yet another embodiment, the sensor area 231*d* may be formed in a portion of both the first and second housing structures 210 and 220. In an embodiment, components for performing various functions may be embedded in the electronic device 200 and exposed to the front surface of the electronic device 200 through the sensor area 231*d* or through one or more openings formed in the sensor area 231*d*. In embodiments, such components may include at least one of a front camera device, a receiver, a proximity sensor, an illuminance sensor, an iris recognition sensor, an ultrasonic sensor, or an indicator.

In an embodiment, the first rear cover 240 may be disposed on the second surface 212 of the first housing structure 210, and may have a substantially rectangular periphery. The periphery may be surrounded, at least in part, by the first housing structure 210. Similarly, the second rear cover 250 may be disposed on the fourth surface 222 of the second housing structure 220, and a substantially rectangular periphery thereof may be surrounded, at least in part, by the second housing structure 220.

In the illustrated embodiment, the first rear cover 240 and the second rear cover 250 may have substantially symmetrical shapes with respect to the folding axis (A). In another embodiment, the first and second rear covers 240 and 250 may have various different shapes. In yet another embodiment, the first rear cover 240 may be integrally formed with the first housing structure 210, and the second rear cover 250 may be integrally formed with the second housing structure 220.

In an embodiment, the first rear cover 240, the second rear cover 250, the first housing structure 210, and the second housing structure 220 may provide together a space in which various components of the electronic device 200 (e.g., a PCB, an antenna module, a sensor module, or a battery) are disposed. In an embodiment, one or more components may be disposed near and visually exposed to the rear surface of the electronic device 200. For example, one or more components or sensors may be visually exposed through a first rear area 241 of the first rear cover 240. In various embodiments, such sensors may include a proximity sensor, a rear camera device, and/or a flash. In another embodiment, at least a portion of a sub display 252 (hereinafter, referred to as a second display) may be visually exposed through a second rear area 251 of the second rear cover 250.

The first display 230 may be disposed in a space formed by the pair of housing structures 210 and 220. For example, the first display 230 may be mounted in the recess 201 formed by the pair of housing structures 210 and 220 while occupying most of the front surface of the electronic device 200. Therefore, the front surface of the electronic device 200 may include the first display 230, a portion (e.g., a periphery) of the first housing structure 210 adjacent to the first display 230, and a portion (e.g., a periphery) of the second housing structure 220. In addition, the rear surface of the electronic device 200 may include the first rear cover 240, a portion (e.g., a periphery) of the first housing structure 210 adjacent to the first rear cover 240, the second rear cover 250, and a portion (e.g., a periphery) of the second housing structure 220 adjacent to the second rear cover 250.

In an embodiment, the first display 230 may refer to a display that allows at least a portion thereof to be deformed into a curved surface. In embodiment, the first display 230 may include a folding area 231*c*, a first area 231*a* disposed on one side (e.g., the right side) with respect to the folding area 231*c*, and a second area 231*b* disposed on the other side (e.g., the left side) with respect to the folding area 231*c*. For example, the first area 231*a* may be disposed on the first surface 211 of the first housing structure 210, and the second area 231*b* may be disposed on the third surface 221 of the second housing structure 220. Such divided areas of the first display 230 are merely examples, and the first display 230 may be divided into a plurality of areas (e.g., two, four or more) according to the structure or function thereof. Although, in an embodiment shown in FIG. 2A, the first display 230 is divided into areas based on the folding area 231*c* running in parallel with the folding axis (A) corresponding to the y-axis, the first display 230 in another embodiment may be divided into areas based on another folding area running in parallel with another folding axis (e.g., corresponding to the x-axis). The above division of the display is merely a virtual division based on the pair of housing structures 210 and 220 and the hinge structure (e.g., the hinge structure 264 in FIG. 3). In practice, regardless of the pair of housing structures 210 and 220 and the hinge structure 264, the first display 230 is capable of displaying one full screen. In an embodiment, the first area 231*a* and the second area 231*b* may have symmetrical shapes as a whole with respect to the folding area 231*c*. However, unlike the second area 231*b*, the first area 231*a* may have a cut portion (e.g., a cut portion 233 in FIG. 3) for exposing the sensor area 231*d*, resulting in an asymmetrical shape. Thus, strictly, the first and second areas 231*a* and 231*b* may have a symmetrical portion and an asymmetrical portion.

Figure 2B:
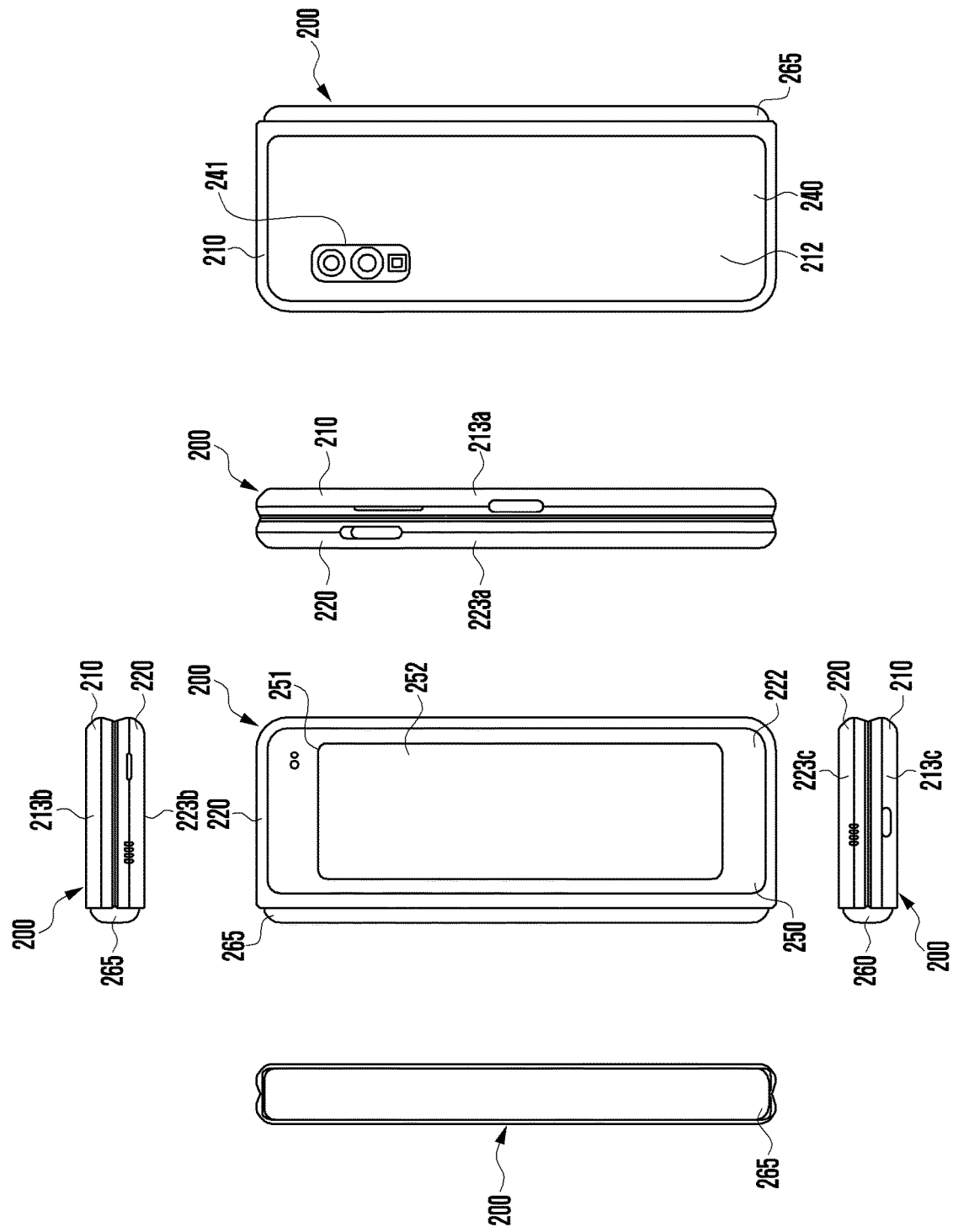
FIG. 2B is a diagram illustrating an example electronic device in a folded state according to various embodiments.

FIG. 2B is a diagram illustrating an example electronic device in a folded state according to various embodiments.

Figure 3:
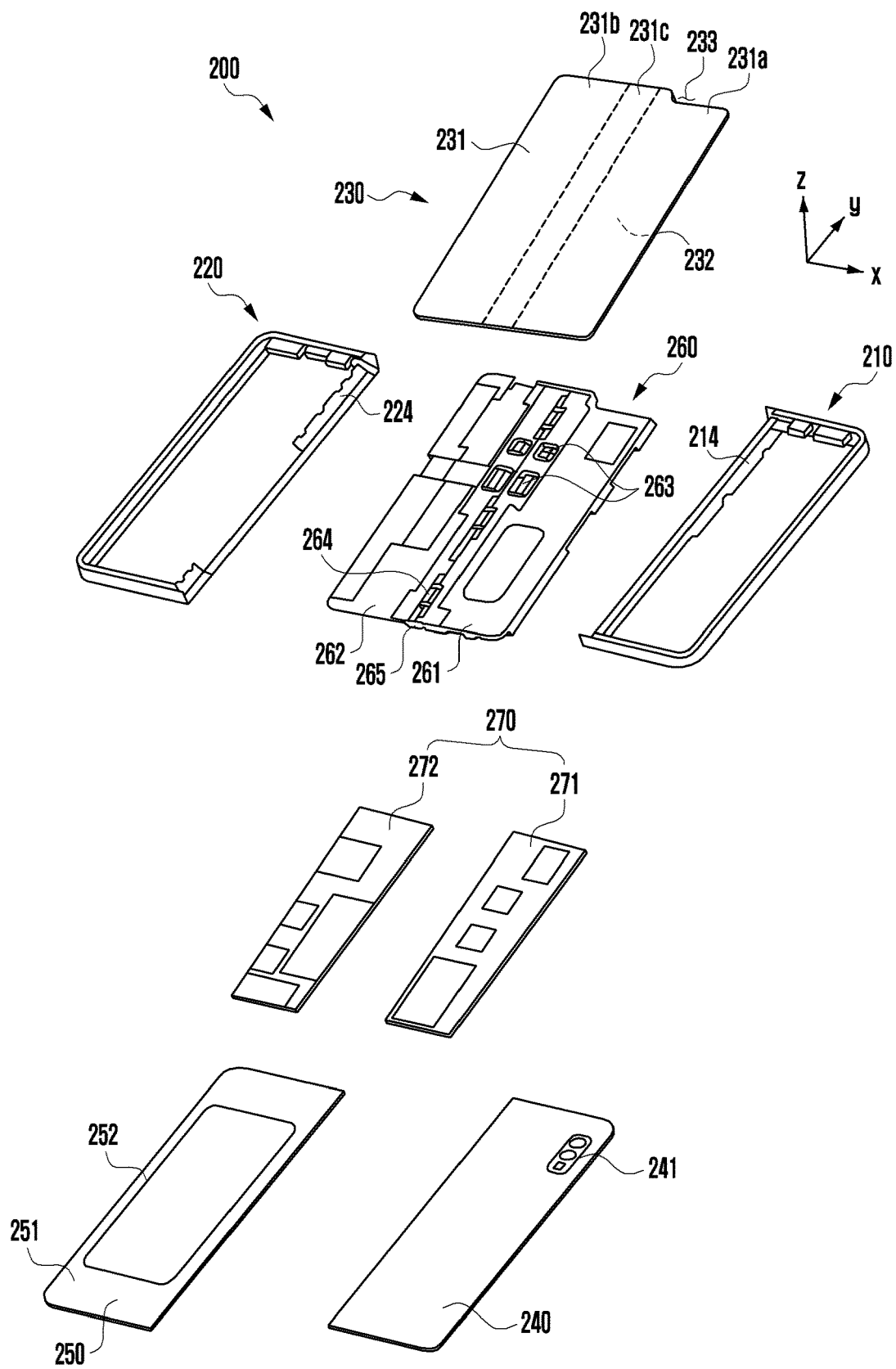
FIG. 3 is an exploded perspective view illustrating an example electronic device according to various embodiments.

Referring to FIG. 2B, the hinge cover 265 is disposed between the first housing structure 210 and the second housing structure 220 to cover any underlying component (e.g., the hinge structure 264 in FIG. 3). In an embodiment, depending on whether the electronic device 200 is in the unfolded state or in the folded state, the hinge cover 265 may be hidden by a part of the first and second housing structures 210 and 220 or exposed to the outside.

When the electronic device 200 is in the unfolded state as shown in FIG. 2A, the hinge cover 265 may be hidden by the first and second housing structures 210 and 220, thus being not exposed. When the electronic device 200 is in the folded state (e.g., a completely folded state) as shown in FIG. 2B, the hinge cover 265 may be exposed to the outside between the first and second housing structures 210 and 220. When the electronic device 200 is in the intermediate state where the first and second housing structures 210 and 220 are folded with a certain angle, the hinge cover 265 may be partially exposed to the outside between the first and second housing structures 210 and 220. The exposed area in the intermediate state may be smaller than that in the completely folded state. In an embodiment, the hinge cover 265 may have a curved surface.

Hereinafter, in each particular state of the electronic device 200, the operations of the first and second housing structures 210 and 220 and the respective areas of the first display 230 will be described.

In an embodiment, when the electronic device 200 is in the unfolded state (e.g., FIG. 2A), the first housing structure 210 and the second housing structure 220 are disposed to form an angle of 180 degrees with each other, and thus the first and second areas 231*a* and 231*b* of the first display 230 face the same direction. In addition, the folding area 231*c* may form the same plane as the first and second areas 231*a* and 231*b*.

In an embodiment, when the electronic device 200 is in the folded state (e.g., FIG. 2B), the first housing structure 210 and the second housing structure 220 are disposed to face each other. Thus, the first and second areas 231a and 231b of the first display 230 may form a very small angle (e.g., between 0 and 10 degrees) and face each other. In addition, the folding area 231c may form, at least in part, a curved surface having certain curvature.

In an embodiment, when the electronic device 200 is in the intermediate state, the first housing structure 210 and the second housing structure 220 are disposed to form a certain angle. Thus, the first and second areas 231a and 231b of the first display 230 may form a certain angle which is greater than the angle in the folded state and smaller than the angle in the unfolded state. In addition, the folding area 231c may form, at least in part, a curved surface having certain curvature which is smaller than the curvature in the folded state.

FIG. 3 is an exploded perspective view illustrating an example electronic device according to various embodiments.

Referring to FIG. 3, in an embodiment, the electronic device 200 may include the first housing structure 210, the second housing structure 220, the first display 230, the first rear cover 240, and the second rear cover 250 all of which are described above. The electronic device 200 may further include a bracket assembly 260 and at least one printed circuit board (PCB) 270. The first display 230 may be also referred to as a display module, a display assembly, or a display unit.

The first display 230 may include a display panel 231 (e.g., a flexible display panel) and at least one plate or layer 232 on which the display panel 231 is mounted. In an embodiment, the plate 232 may be disposed between the display panel 231 and the bracket assembly 260. The display panel 231 may be disposed on one surface (e.g., a surface in the z-axis direction in FIG. 3) of the plate 232. The plate 232 may be formed in a shape corresponding to the display panel 231. For example, a portion of the plate 232 may be formed in a shape corresponding to the cut portion 233 of the display panel 231.

The bracket assembly 260 may include a first bracket 261, a second bracket 262, the hinge structure 264 disposed between the first and second brackets 261 and 262, the hinge cover 265 covering the hinge structure 264 (when viewing the hinge structure 264 from the outside), and at least one wiring member 263 (e.g., a flexible printed circuit board (FPCB)) intersecting with the first and second brackets 261 and 262.

In an embodiment, the bracket assembly 260 may be disposed between the plate 232 and the at least one PCB 270. For example, the first bracket 261 may be disposed between the first area 231a of the first display 230 and a first PCB 271, and the second bracket 262 may be disposed between the second area 231b of the first display 230 and a second PCB 272.

In an embodiment, the wiring member 263 and the hinge structure 264 may be disposed, at least in part, inside the bracket assembly 260. The wiring member 263 may be disposed in a direction (e.g., the x-axis direction) that crosses the first and second brackets 261 and 262. That is, the wiring member 263 may be disposed in a direction perpendicular to the folding axis (e.g., the y-axis or the folding axis (A) in FIG. 2A) of the folding area 231c.

As mentioned above, the at least one PCB 270 may include the first PCB 271 disposed to correspond to the first bracket 261, and the second PCB 272 disposed to correspond to the second bracket 262. The first and second PCBs 271 and 272 may be disposed in a space formed by all of the bracket assembly 260, the first housing structure 210, the second housing structure 220, the first rear cover 240, and the second rear cover 250. On the first and second PCBs 271 and 272, electronic components for implementing various functions of the electronic device 200 may be mounted.

In an embodiment, while the first display 230 is combined with the bracket assembly 260, the first housing structure 210 and the second housing structure 220 may be assembled to each other to be combined with both sides of the bracket assembly 260. As described below, the first housing structure 210 and the second housing structure 220 may be combined with the bracket assembly 260 by sliding on both sides of the bracket assembly 260.

In an embodiment, the first housing structure 210 may include a first rotation supporting surface 214, and the second housing structure 520 may have a second rotation supporting surface 224 corresponding to the first rotation supporting surface 214. The first rotation supporting surface 214 and the second rotation supporting surface 224 may include curved surfaces corresponding to curved surfaces included in the hinge cover 265.

In an embodiment, when the electronic device 200 is in the unfolded state (e.g., FIG. 2A), the first and second rotation supporting surfaces 214 and 224 cover the hinge cover 265 so that the hinge cover 265 may not be exposed or may be minimally exposed to the rear surface of the electronic device 200. In addition, when the electronic device 200 is in the folded state (e.g., FIG. 2B), the first and second rotation supporting surfaces 214 and 224 rotate along the curved surfaces included in the hinge cover 265 so that the hinge cover 265 may be maximally exposed to the rear surface of the electronic device 200.

In an embodiment, the second display 252 may be mounted on the second rear cover 250 and exposed to the outside through the rear surface of the electronic device 200.

FIGS. 4A, 4B, 4C, 4D, 4E and 4F are perspective views illustrating example use states of an example electronic device in a folding or unfolding operation according to various embodiments.

The electronic device 200 (e.g., the electronic device 101 in FIG. 1) according to various embodiments may include a foldable housing 410, a first display 430 (e.g., the first display 230 in FIG. 2A), and a second display 440 (e.g., the second display 252 in FIG. 2A).

According to various embodiments, the electronic device 200 may include the foldable housing 410 that includes the first housing structure 210 and the second housing structure 220 connected by a hinge structure (e.g., the hinge structure 264 in FIG. 3).

According to various embodiments, the first and second housing structures 210 and 220 may be connected to be foldable to each other. The first and second housing structures 210 and 220 may be foldable to each other about a folding axis 420 (e.g., the folding axis (A) in FIG. 2A) extending in the first direction. The first and second housing structures 210 and 220 may be disposed to face each other in a folded state.

Figure 4A:
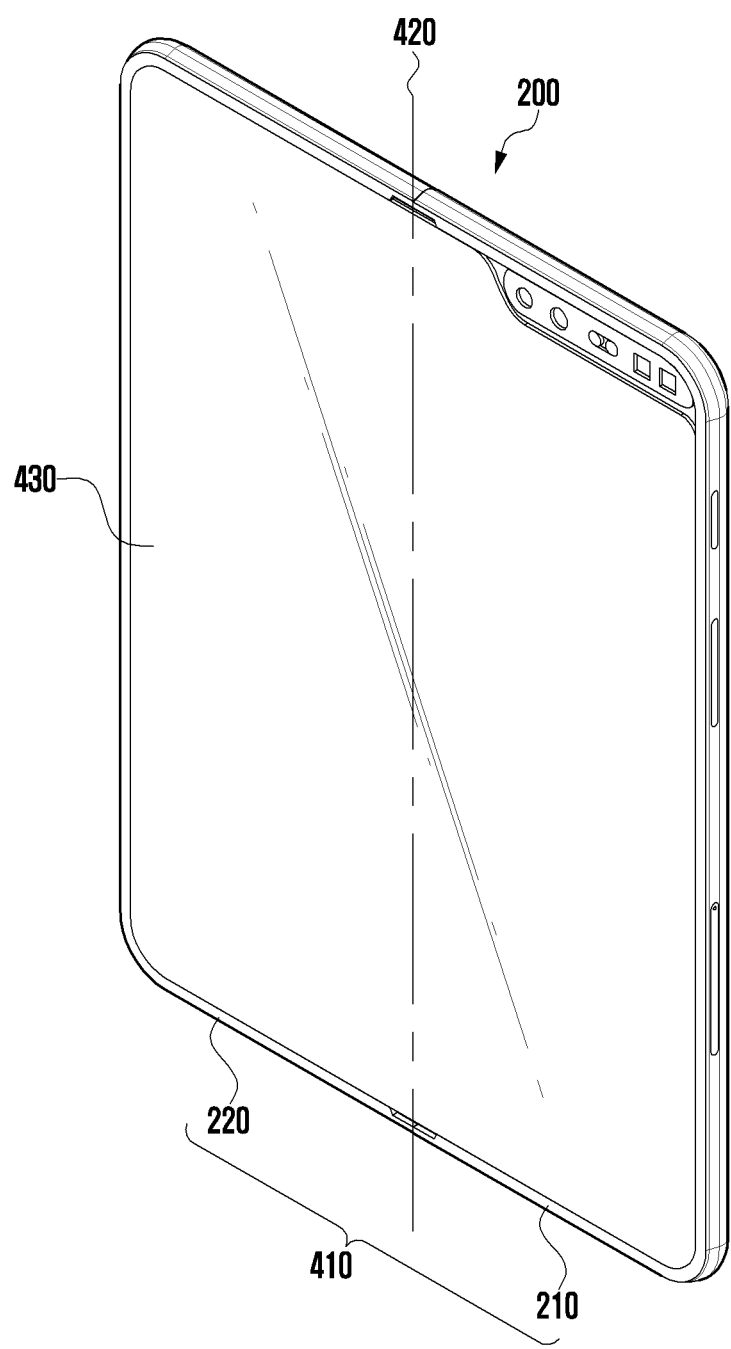
FIGS. 4A, 4B, 4C, 4D, 4E and 4F are perspective views illustrating example states of an electronic device in a folding or unfolding operation according to various embodiments.

Referring to FIG. 4A, an angle formed between the first housing structure 210 and the second housing structure 220 may be about 180 degrees. As such, when the angle between the first and second housing structures 210 and 220 is greater than a predetermined angle (e.g., about 170 degrees), it may refer, for example, to the electronic device (or the first display 430) being in the unfolded state. When the electronic device 200 is in the unfolded state, the first housing structure 210 and the second housing structure 220 may form a substantially planar structure.

Figure 4B:
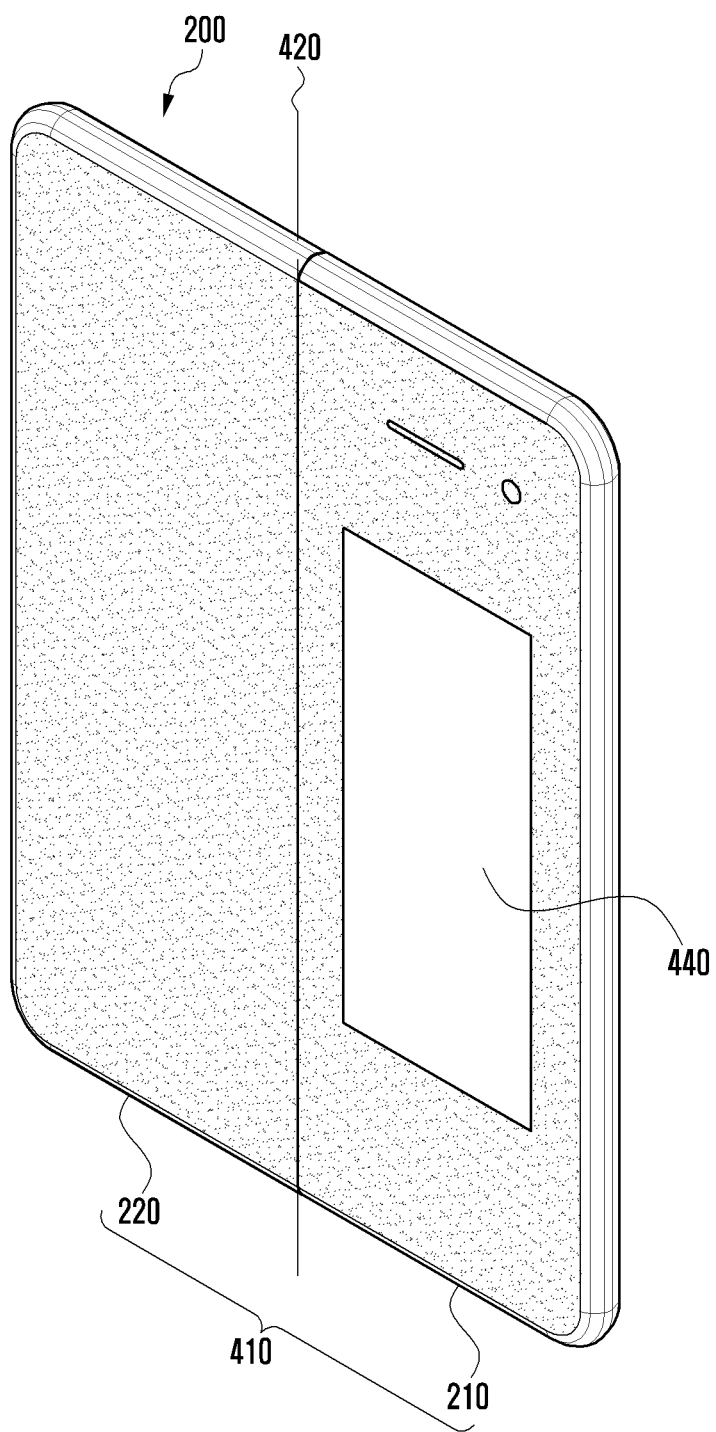

Referring to FIG. 4B, the electronic device 200 according to various embodiments may further include the second display 440 (e.g., the second display 252 in FIG. 2A).

In various embodiments, the second display 440 may include a flexible display or a foldable display, and may be formed to have a size covering both the first housing structure 210 and the second housing structure 220.

Figure 4C:
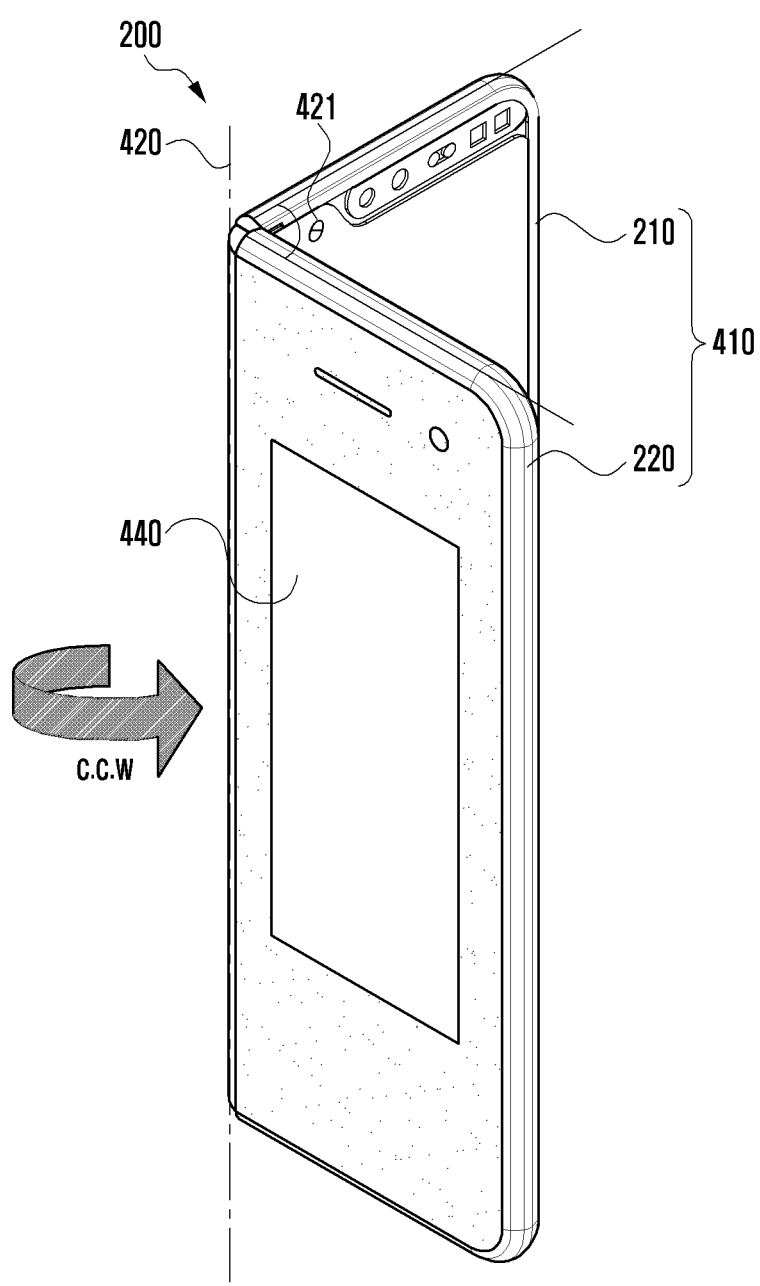
Figure 4D:
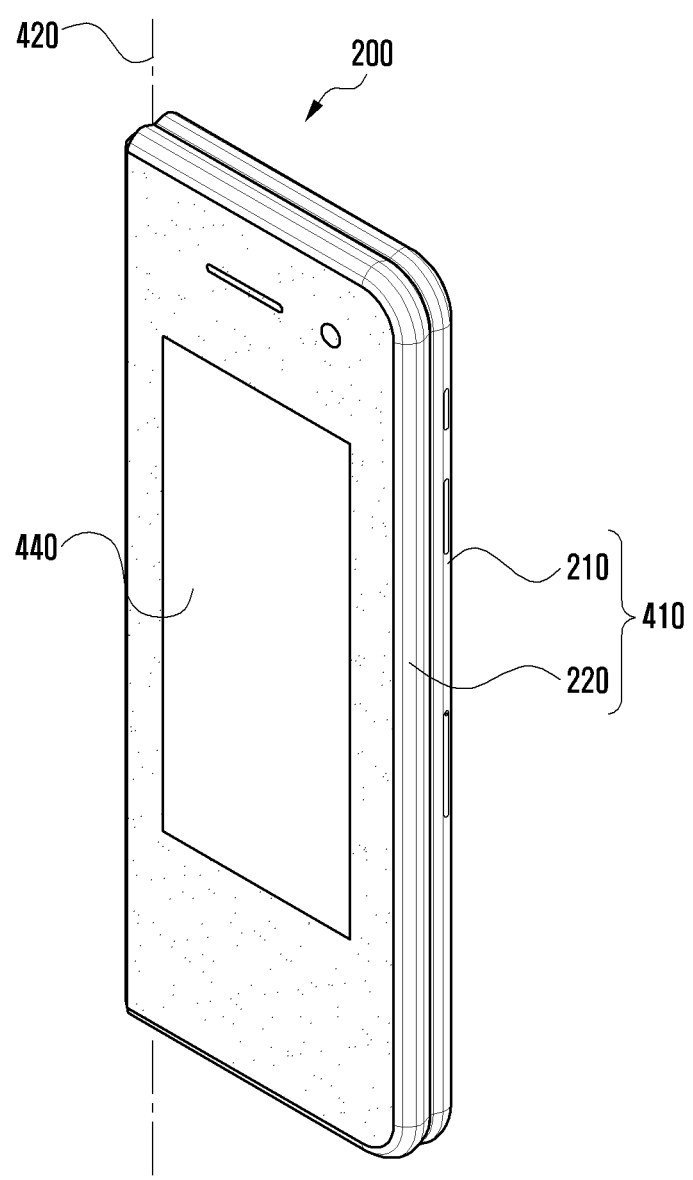

FIG. 4C illustrates the electronic device 200 in a partially folded state, partially folded in a counterclockwise direction about the folding axis 420 (e.g., wherein the first and second housing structures 210, 220 form an acute angle θ), and FIG. 4D illustrates the electronic device 200 in a completely folded state, folded about the folding axis 420.

Referring to FIGS. 4C and 4D, the user of the electronic device 200 may fold the unfolded electronic device 200 or unfold the folded electronic device 200 about the folding axis 420 by applying a force to the electronic device 200.

While the electronic device 200 is folded or unfolded, a user's finger may touch the first display 430 and/or the second display 440. This touch may be detected by a touch sensor of the first display 430 and/or a touch sensor of the second display 440. This touch may be a user's unintended touch rather than an intended touch for an actual input action on the screen.

Figure 4E:
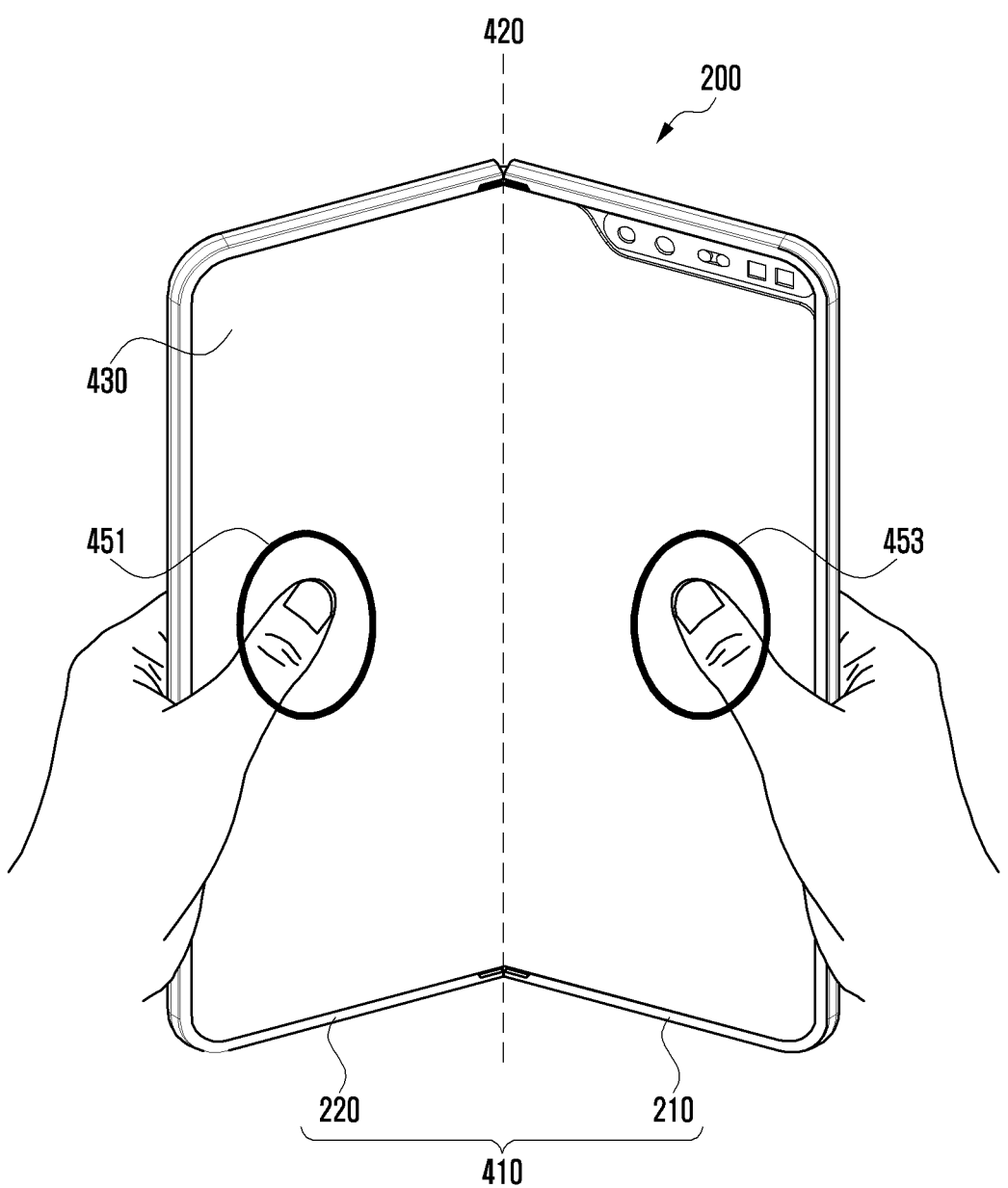

Referring to FIG. 4E, while the electronic device 200 is folded or unfolded, the electronic device 200 may receive a user input on the first display 430. For example, the electronic device 200 may receive a user input on some portions 451 and 453 of the first display 430. This user input may be an unintended touch.

Figure 4F:
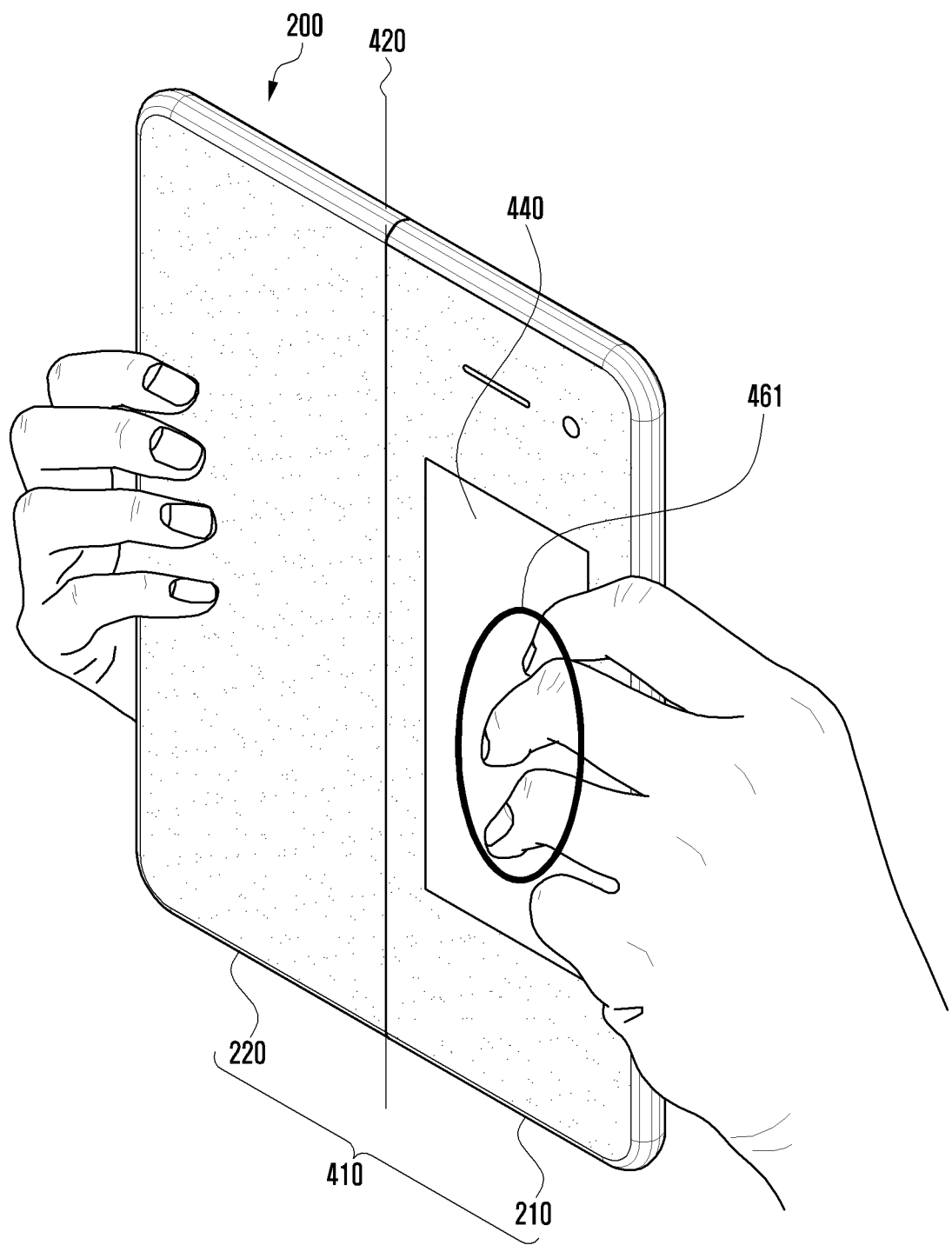

Referring to FIG. 4F, while the electronic device 200 is folded or unfolded, the electronic device 200 may receive a user input on the second display 440. For example, the electronic device 200 may receive a user input on a certain portion 461 of the second display 440. This user input may be an unintended touch.

Figure 5:
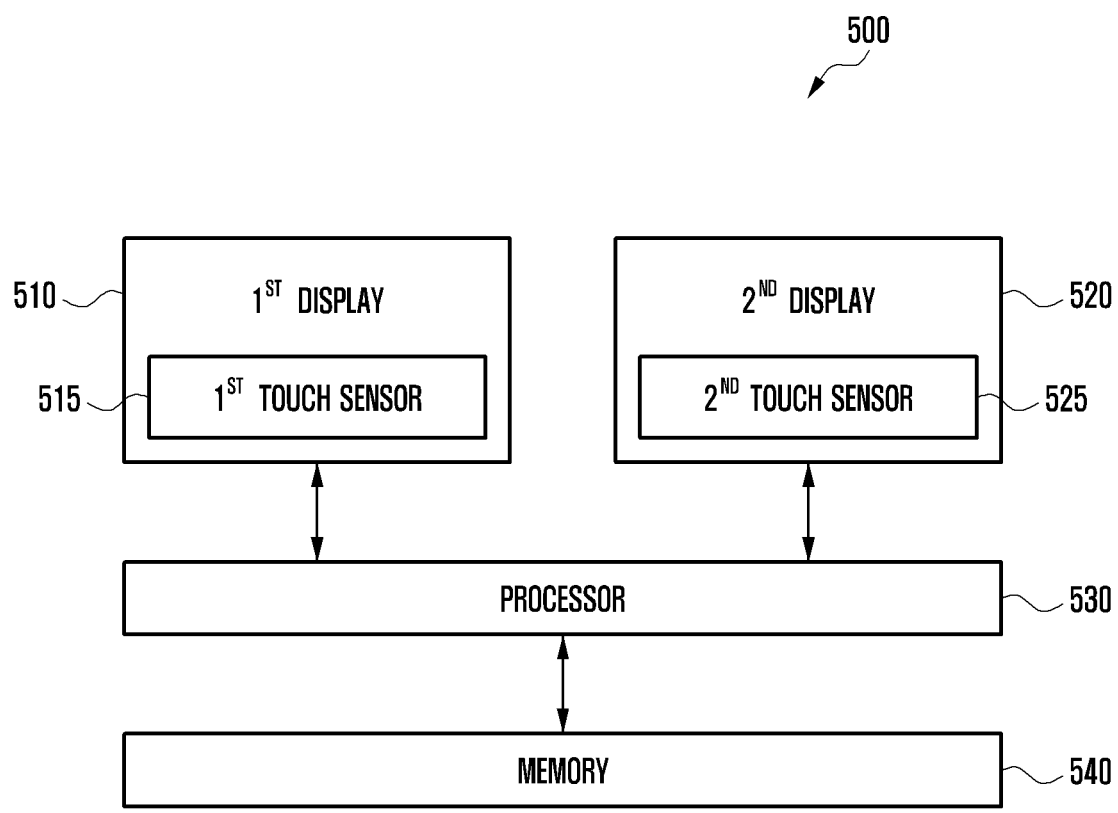
FIG. 5 is a block diagram illustrating an example electronic device according to various embodiments.

FIG. 5 is a block diagram illustrating an example electronic device 500 according to various embodiments.

Referring to FIG. 5, the electronic device 500 (e.g., the electronic device 101 in FIG. 1 or the electronic device 200 in FIG. 2A) may include a first display 510 (e.g., the first display 230 in FIG. 2A or the first display 430 in FIG. 4A), a second display 520 (e.g., the second display 252 in FIG. 2A or the second display 440 in FIG. 4B), a processor (e.g., including processing circuitry) 530, and a memory 540. Some of such components of the electronic device 500 may be omitted or replaced. The electronic device 500 may include at least some of the configurations and/or functions of the electronic device 101 in FIG. 1. The electronic device 500 may include the structures shown in FIGS. 2A, 2B, and 3, and may include the foldable structure as described with reference to FIGS. 4A to 4F.

According to various embodiments, the first display 510 may be disposed on a first surface (or front surface) of a housing of the electronic device 500 in a first direction. The first display 510 may include a first touch sensor 515 that detects a touch input occurring on the first display 510. The first touch sensor 515 may be implemented in one of various schemes such as, for example, and without limitation, an in-cell scheme, an on-cell scheme, or the like.

According to various embodiments, the first display 510 may be folded. Based on a folding area (e.g., the folding area 231c in FIG. 2A), the first display 510 may be divided into a first area (e.g., the first area 231a in FIG. 2A) and a second area (e.g., the second area 231b in FIG. 2A), and may be folded in a direction where the first area and the second area face each other. Therefore, when the electronic device 500 is folded, the first display 510 may not be visible to the user.

According to various embodiments, the second display 520 may be disposed on a second surface (or rear surface) of the housing of the electronic device 500 in a second direction. The second display 520 may be disposed on one of rear covers of the housing (e.g., the second rear cover 250 in FIG. 2A). Therefore, the area (or the widthwise length) of the second display 520 may, for example, be half or less than that of the first display 510.

According to various embodiments, the second display 520 may include a second touch sensor 525 that detects a touch input occurring on the second display 520. The implementation scheme of the second touch sensor 525 may, for example, be the same as the first touch sensor 515.

According to various embodiments, the first touch sensor 515 and/or the second touch sensor 525 may provide the processor 530 with a touch event corresponding to the touch input. The touch event may include, for example, and without limitation, a press event, a release event, a cancel event, or the like. For example, when the user presses a certain region of the first display 510, the first touch sensor 515 may provide the press event to the processor 530 together with the coordinates of the pressed region. When the user releases such a touch, the first touch sensor 515 may provide the release event to the processor 530. When the touch is removed without being released, for example, when the user's finger moves without releasing the touch and thereby leaves the touch region, the first touch sensor 515 may provide the cancel event to the processor 530.

According to various embodiments, the processor 530 may provide a received touch event to an application corresponding to the touch event (or an application displayed in the foreground). When providing the press event or the release event to the application, the processor 530 may perform a corresponding operation. When providing the cancel event after the press event, the processor 530 may cancel the operation performed according to the press event.

According to various embodiments, while the electronic device 500 is unfolded, the second display 520 and the second touch sensor 525 may be in an inactivated state. Therefore, even if a user's touch occurs on the second display 520, the second touch sensor 525 does not generate a touch event. According to another embodiment, even when the electronic device 500 is unfolded, the second display 520 and the second touch sensor 525 may be in an activated state, and therefore the second touch sensor 525 may generate a touch event in respond to a user's touch input.

According to various embodiments, the memory 540 may include a volatile memory and a nonvolatile memory, which are known in the art and not limited to specific implementation. The memory 540 may include at least some of configurations and/or functions of the memory 130 shown in FIG. 1. In addition, the memory 540 may store at least a part of the program 140 shown in FIG. 1.

According to various embodiments, the memory 540 may be functionally, operatively, and/or electrically connected to the processor 530, and may store various instructions being executable by the processor 530. These instructions may include various control commands recognizable to the processor 120 in connection with arithmetic and logical operations, data transfer, input/output, and/or the like.

According to various embodiments, the processor 530 may include various processing circuitry and is configured to perform operations or data processing related to control and/or communication of components of the electronic device 501, and may include at least some of configurations and/or functions of the processor 120 shown in FIG. 1. The processor 530 may be functionally, operatively, and/or electrically connected to internal components of the electronic device 500 including the first display 510, the second display 520, and the memory 540.

The operation and data processing functions that can be implemented by the processor 530 in the electronic device 500 are not limited. However, in the disclosure, descriptions will be focused on operations of processing a touch event and operations of displaying an application screen seamlessly between the first display 510 and the second display 520 when a folding or unfolding gesture occurs. The operations of the processor 530 to be described hereinafter may be performed by loading instructions stored in the memory 540.

According to various embodiments, the processor 530 may execute an application stored in the memory 540. In a state where the electronic device 500 (or the first display 510) is unfolded, the processor 530 may display an execution screen of the application on the first display 510. In the unfolded state of the electronic device 500, the second display 520 may be turned off by operating in a power saving mode or may display only brief information such as time by operating in an always-on-display (AOD) mode.

In addition, when the electronic device 500 is unfolded, the first touch sensor 515 of the first display 510 may provide the processor 530 with a touch event corresponding to a touch input on the first display 510. The second display 520 and the second touch sensor 525 may be in an inactivated state, and therefore the second touch sensor 525 may not detect the touch input.

According to various embodiments, the electronic device 500 may include no bezel area or only a very narrow bezel area so that the first display 510 covers substantially the entire first surface of the housing.

According to various embodiments, in a state where the electronic device 500 (or the first display 510) is folded, the processor 530 may display an execution screen of the application on the second display 520. In the folded state of the electronic device 500, the first and second areas of the first display 510 face each other and are not recognized by the user. Therefore, the first display 510 may not display a screen by operating in a power saving mode, and also the first touch sensor 515 may not detect a touch input.

According to various embodiments, the processor 530 may detect a folding gesture for the electronic device 500 (or the first display 510) in the unfolded state. As described above with reference to FIGS. 4A, 4B, 4C, 4D, 4E and 4F, the user may apply a force to the housing of the electronic device 500 to fold the first and second areas of the first display 510 to face each other. When the electronic device 500 is folded, the processor 530 may detect the folding gesture through a variation in angle between a first housing structure (e.g., the first housing structure 210 in FIG. 2A) covering the first area of the first display 510 and a second housing structure (e.g., the second housing structure 220 in FIG. 2B) covering the second area of the first display 510, based on the folding area (e.g., the folding area 231c in FIG. 2A). For example, when the angle between the first and second housing structures (e.g., 8) is about 180 degrees, the processor 530 recognizes it as the unfolded state. When an angle change occurs in the unfolded state, the processor 530 determines that the folding gesture is started. When the angle decreases below a reference value (e.g., 10 degrees), the processor 530 determines that the folding gesture is completed.

According to various embodiments, when the folding gesture is started, the processor 530 may request the first touch sensor 515 of the first display 510 to stop transmitting the touch event. This is because, as described above with reference to FIGS. 4A, 4B, 4C, 4D, 4E and 4F, the touch on the first display 510 during folding is a user's unintended touch. According to another embodiment, when the folding gesture is started, the processor 530 may ignore the received touch event without requesting the first touch sensor 515 to stop transmitting the touch event. That is, even if any touch event is received, it may not be provided to the application. In this case, because the second display 520 and the second touch sensor 525 are still inactive, the second touch sensor 525 may not generate and transmit a touch event.

According to various embodiments, the processor 530 may switch the first display 510 to an inactivated state in response to the folding gesture. A time point of turning off a screen of the first display 510 and stopping a touch detection of the first touch sensor 515 is not limited. For example, the processor 530 may perform a control operation of turning off a screen of the first display 510 and stopping a touch detection of the first touch sensor 515 when the folding gesture is determined to be completed as described above by a decrease of the angle (e.g., 10 degrees or less) of the first display 510 being folded, or when a touch lock screen to be described later is displayed on the second display 520.

According to various embodiments, the processor 530 may switch the second display 520 to an activated state in response to the folding gesture. However, even in this case, the processor 530 may maintain the second touch sensor 525 in an inactivated state until the touch lock screen is displayed, or may not process a touch event occurring at the second touch sensor 525 even if the second touch sensor 525 is activated together with the second display 520. According to other embodiments, both the second display 520 and the second touch sensor 525 may be activated in the folded state or the unfolded state of the electronic device 500.

According to various embodiments, the processor 530 may cancel a touch event (e.g., a press event or a release event) having been provided to the application before the folding gesture is started. For example, the processor 530 may cancel the execution of the application to be carried in response to the touch event, or cancel the execution of the application having been already carried in response to the touch event.

According to various embodiments, when the folding gesture is started, the processor 530 may provide the application with a cancel event corresponding to a touch event previously provided. For example, even if a press event actually occurs during the folding gesture, it is not a user's intention. Thus, the processor 530 may provide the cancel event to the application even if the press event is received from the touch sensor. This prevents and/or reduces the application from being operated wrongly by recognizing a touch for folding as a touch event. Therefore, the application may not perform an operation according to a touch event generated by the first touch sensor 515 before the first display 510 is folded.

According to various embodiments, the electronic device 500 may include a sensor (e.g., an acceleration sensor or a gyro sensor) disposed on the first housing structure and/or the second housing structure, thus identifying the pattern of the folding gesture from the sensor.

According to various embodiments, the processor 530 may identify whether an application is resizable. For example, from attribute information of the application, the processor 530 may identify whether an execution screen of the application is resizable.

According to various embodiments, the first display 510 may display various screens, based on the control of the processor 530. The first display 510 may support a full screen mode for displaying a full screen without splitting the screen, or a split screen mode for displaying different screens in respective regions into which the screen is split.

According to various embodiments, the first display 510 may display different screens in respective split regions such as a first region, a second region, and a third region. The sizes of the split regions may be different from each other. The number and sizes of the split regions may be varied depending on the intention of the user or designer.

According to various embodiments, the memory 540 may store a user's history of using the electronic device 500 in the split screen mode. This history may include information indicating, from among the split regions, a specific region where a screen associated with an executed application is displayed in the split screen mode. For example, in the split screen mode, the first display 510 may display a screen divided into a first region, a second region, and a third region. The processor 530 may store, in the memory 540, a history including information of an application executed in the first region, information of an application executed in the second region, and information of an application executed in the third region.

According to various embodiments, the processor 530 may control the first display 510 to display a plurality of split screens in response to receiving a signal of request for entry into the split screen mode.

Figure 6:
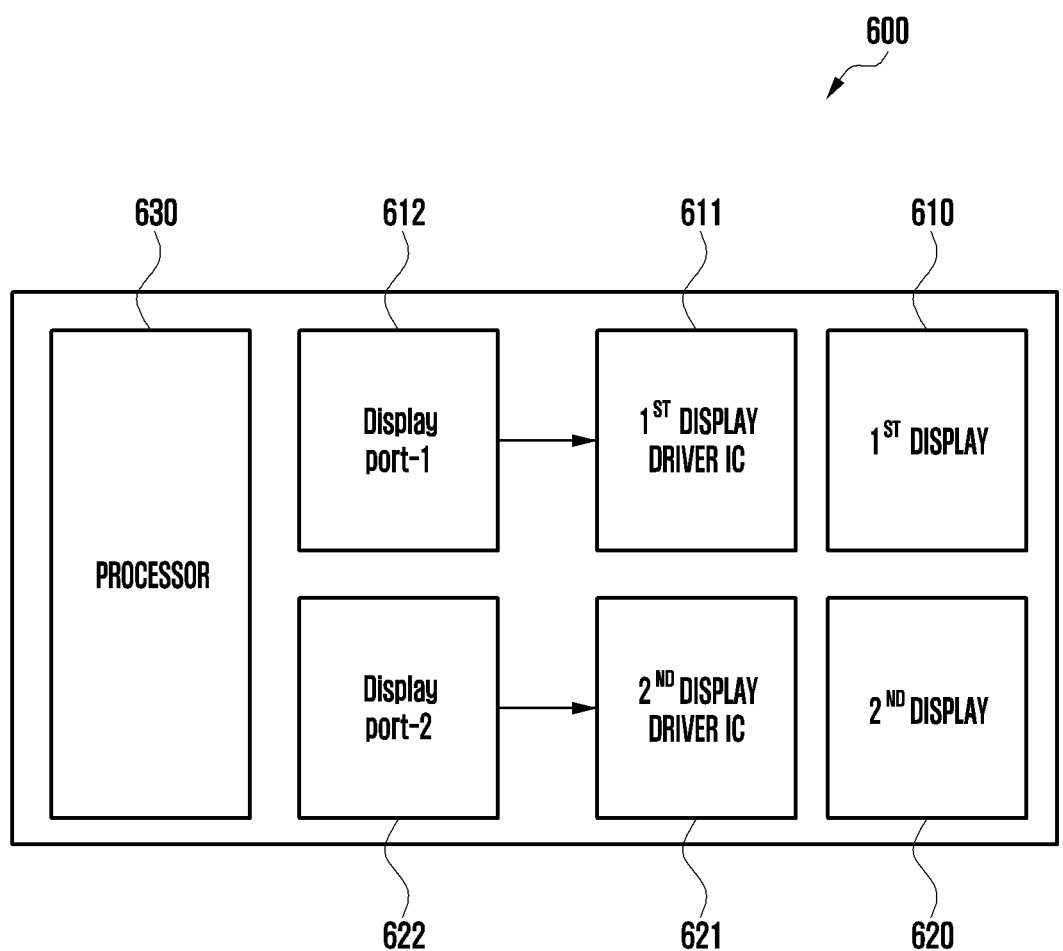
FIG. 6 is a block diagram illustrating a display-related configuration of an example electronic device according to various embodiments.

FIG. 6 is a block diagram illustrating an example display-related configuration of an electronic device according to various embodiments.

Referring to FIG. 6, the electronic device 600 (e.g., the electronic device 101 in FIG. 1, the electronic device 200 in FIG. 2A, or the electronic device 500 in FIG. 5) may include a first display 610 (e.g., the first display 230 in FIG. 2A, the first display 430 in FIG. 4A, or the first display 510 in FIG. 5), a second display 620 (e.g., the second display 252 in FIG. 2A, the second display 440 in FIG. 4B, or the second display 520 in FIG. 5), a first display driver IC 611, a second display driver IC 621, and a processor (e.g., including processing circuitry) 630.

According to an embodiment, the first display driver IC 611 may include an interface module (not shown), a memory (e.g., a buffer memory) (not shown), an image processing module (not shown), and/or a mapping module (not shown). The first display driver IC 611 may receive image information containing image data and/or an image control signal corresponding to a command for controlling the image data from other components of the electronic device 600 through the interface module. For example, the first display driver IC 611 may receive the image information from the processor 630 or from an auxiliary processor (e.g., a graphics processing unit) that may be operated independently of the processor 630. According to an embodiment, the first display driver IC 611 may communicate with a touch circuit or a sensor module through the interface module. According to an embodiment, the first display driver IC 611 may store at least part of the received image information in the memory, for example, in units of frames. According to an embodiment, the image processing module may perform pre-processing or post-processing (e.g., adjusting resolution, brightness, or size) of at least part of the image data, based at least on the characteristics of the image data or the characteristics of the first display 610. According to an embodiment, the mapping module may generate a voltage value or a current value corresponding to the image data pre-processed or post-processed through the image processing module. According to an embodiment, the generation of the voltage value or the current value may be performed, based on at least in part the attributes of pixels of the first display 610 (e.g., an array of pixels (RGB stripe or pentile structure), or the size of each subpixel). At least some pixels of the first display 610 may be driven based on at least in part the voltage value or the current value, and thereby visual information (e.g., text, images, icons) corresponding to the image data may be displayed through the first display 610.

According to an embodiment, the second display driver IC 621 may drive the second display 620 to display an image based on the image information received from the processor 630. According to an embodiment, the second display driver IC 621 may include the same or similar components as those of the first display driver IC 611, except for driving the second display 620. For example, the second display driver IC 621 may include an interface module (not shown), a memory (e.g., a buffer memory) (not shown), an image processing module (not shown), and/or a mapping module (not shown) which perform operations similar to those of the first display driver IC 611.

According to an embodiment, the processor 630 may include a first display port 612 operatively connected to the first display driver IC 611, and a second display port 622 operatively connected to the second display driver IC 621. For example, the processor 630 may transmit first image information to the first display driver IC 611 through the first display port 612 and also transmit second image information to the second display driver IC through the second display port 622.

According to an embodiment, the first image information and the second image information may be identical to each other. For example, the processor 630 may transmit image information containing the same image data to both the first display driver IC 611 and the second display driver IC 621.

According to another embodiment, image data contained in the second image information may include at least part of image data contained in the first image information. For example, the processor 630 may receive a user input for selecting part of first image data (e.g., the entire image displayed on the first display 610) and, based on the received input, transmit second image data (e.g., a part of the entire image displayed on the first display 610), which is part of the first image data, to the second display driver IC 621.

According to still another embodiment, the processor 630 may transmit the same image data to both the first display driver IC 611 and the second display driver IC 621, and further transmit coordinate information based the user input to the second display driver IC 621. For example, the coordinate information may define a specific part (e.g., the second image data), selected by the user, of the first image data, and the second display driver IC 621 may drive the second display 620 to display the specific part of the first image data, based on the coordinate information.

Figure 7:
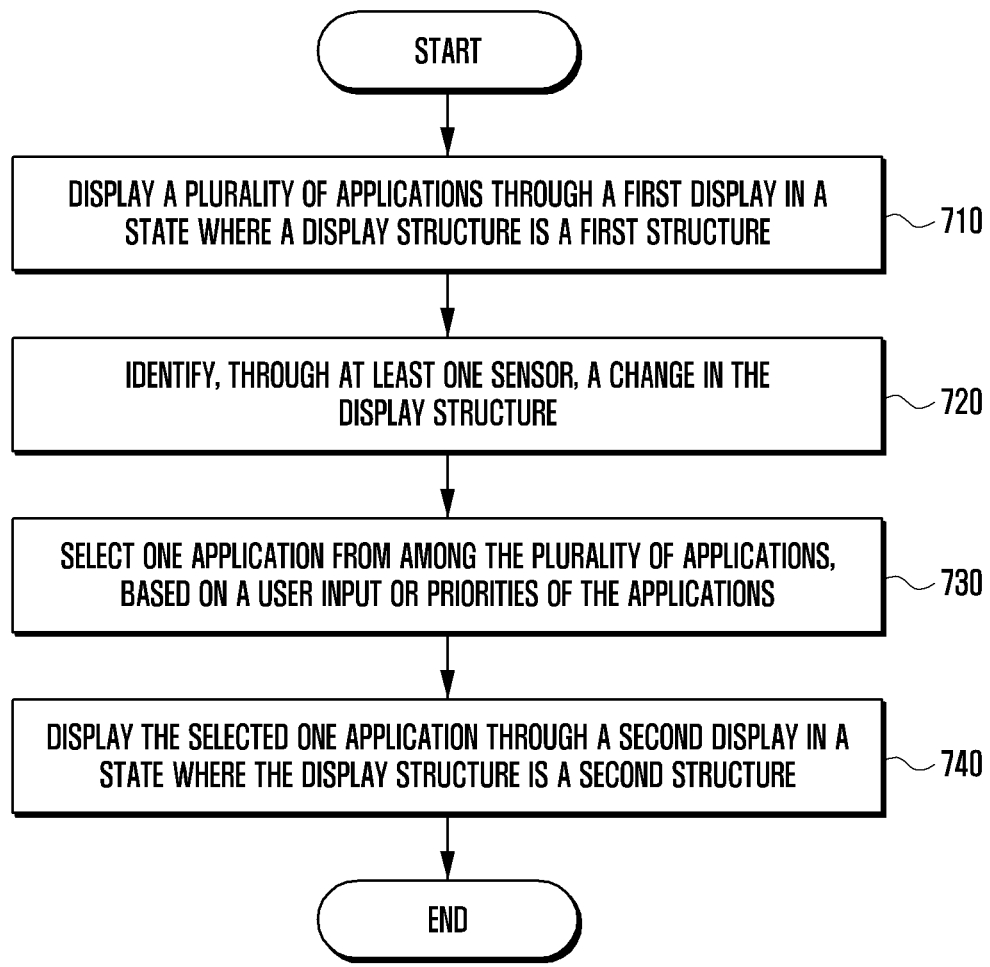
FIG. 7 is a flowchart illustrating an example method for controlling and operating a display of an electronic device according to various embodiments.

FIG. 7 is a flowchart illustrating an example method for controlling and operating a display of an electronic device according to various embodiments.

Operations 710, 720, 730 and 740 shown in FIG. 7 will be described with reference to the configuration of the electronic device 101 of FIG. 1.

Referring to FIG. 7, at operation 710, the processor 120 of the electronic device 101 according to various embodiments may display a plurality of applications through a first display (e.g., the first display 230 in FIG. 2A, the first display 430 in FIG. 4A, the first display 510 in FIG. 5, or the first display 610 of FIG. 6) in a state where a display structure is a first structure (e.g., an unfolded state).

According to various embodiments, the processor 120 may display a plurality of application screens on the first display. For example, the processor 120 may support a split screen mode to split a first display screen into a plurality of regions and then display different application screens in the respective split regions. For example, the processor 120 may split the first display screen into a first region, a second region, and a third region, and display different application screens in the respective split regions. The sizes of the split regions may be different from each other, and the number and sizes of the split regions may be varied depending on the intention of a user or designer. For example, the first region, the second region, and the third region may display execution screens of a main application, a first sub-application, and a second sub-application, respectively.

At operation 720, the processor 120 of the electronic device 101 according to various embodiments may identify, through at least one sensor, a change in the display structure.

According to various embodiments, the processor 120 may identify a pattern of a folding gesture from a sensor (e.g., an acceleration sensor, a gyro sensor, or a magnet sensor) disposed in a first housing structure (e.g., the first housing structure 210 in FIG. 2A) and/or a second housing structure (e.g., the second housing structure 220 in FIG. 2B). For example, as previously described with reference to FIGS. 4A, 4B, 4C, 4D, 4E and 4F, the processor 120 may recognize that a first area (e.g., the first area 231a in FIG. 2A) and a second area (e.g., the second area 231b in FIG. 2A) of the first display are folded to face each other.

According to various embodiments, when the electronic device 100 (or the first display thereof) is folded, the processor 120 may detect the folding gesture from a change in angle between the first and second housing structures covering the first and second areas of the first display, respectively, which are disposed at both sides of a folding area (e.g., the folding area 231c in FIG. 2A). For example, when the angle between the first and second housing structures is about 180 degrees, the processor 120 may recognize the display structure as being in the unfolded state (e.g., the first structure state). If an angle change occurs in the unfolded state, the processor 120 may determine that the folding gesture is started. Thereafter, when the angle decreases below a reference value (e.g., 10 degrees), the processor 120 may determine that the display structure is in the folded state (e.g., the second structure state).

At operation 730, the processor 120 of the electronic device 101 according to various embodiments may select one application from among the plurality of applications, based on a user input or priorities of the applications.

According to various embodiments, the processor 120 may select one of the plurality of applications, based on a user input. For example, the processor 120 may receive a user input of selecting one of the plurality of applications through the first display in a state where the display structure is the first structure, and may select one of the plurality of applications in response to the received user input.

According to various embodiments, the processor 120 may receive a user input of selecting one of the plurality of applications through the second display in a state where the display structure is the second structure. For example, when the display structure is in the second structure state, the processor 120 may provide the second display with a plurality of indications (e.g., thumbnails, icons, app cards, or preview images) corresponding to the respective applications, or with a list of the applications. Then, the processor 120 may receive a user input through the plurality of indications or the application list, and select one of the applications.

According to various embodiments, the processor 120 may select one of the plurality of applications, based on the priorities of the applications. For example, the priorities may be determined, based on at least one of a setting value of each application, attribute information of each application, focus information, or history information.

According to various embodiments, the setting value of the application may be determined, based on a user input of designating the priority. For example, the user may designate the priorities (e.g., high priority, normal priority, low priority, etc.) for the respective applications through the application list. According to an embodiment, the processor 120 may receive a user input of selecting at least one application in the application list and assign a high priority to the selected application(s).

According to various embodiments, the attribute information of the application may include the priority of the application. For example, the attribute information of the application may include a value indicating whether an execution screen of the application is resizable. When the execution screen of the application is resizable, the application may have a high priority. For example, when the area (or widthwise length) of the second display is half or less than the area (or widthwise length) of the first display, or when the resolution of the second display is lower than the resolution of the first display, the execution screen of the application may need to be resized, and thus a high priority may be given to the resizable application.

According to various embodiments, the focus information may include information about a focused application that is estimated to be of interest by the user among the plurality of applications displayed on the first display. For example, although the processor 120 displays execution screens of the main application, the first sub-application, and the second sub-application through the first region, the second region, and the third region, respectively, the user may be more interested in the first sub-application than the main application. Thus, based on a predetermined rule, the processor 120 may determine the focused application.

According to an embodiment, the processor 120 may determine the focused application, based on a user input or a characteristic of the application. As an example, the processor 120 may determine, as the focused application, a specific application on which user inputs are concentrated, or a specific application from which the last user input is detected. As another example, even if no user input is detected, the processor 120 may determine, as the focused application, the last executed application or a specific application (e.g., a video application) that continuously updates a screen.

According to an embodiment, the processor 120 may display the focused application to be distinguished from the other applications. For example, in order to distinctively display the focused application, the processor 120 may process at least one of the size, color, or UI of the focused application differently from the other applications.

According to various embodiments, the history information may include score information of applications. For example, the processor 120 may determine scores of the applications, based on the execution count and/or execution time of each application executed through the second display. For example, processor 120 may assign a high priority to a frequently used application and/or an application used for a long time.

At operation 740, the processor 120 of the electronic device 101 according to various embodiments may display the selected one application through the second display in a state where the display structure is the second structure (e.g., a folded state).

According to various embodiments, the processor 120 may display an application selection bar together with the selected one application through the second display. The application selection bar may include, for example, information about the other applications unselected from among the plurality of applications. When the user selects a specific application through the application selection bar, the processor 120 may switch the currently displayed application to the selected application.

If there is no selected application, the processor 120 according to various embodiments may display the main application through the second display, or operate the second display in a power saving mode (e.g., screen off) or an always-on-display (AOD) mode to display only brief information such as time.

FIG. 8A is a diagram illustrating an example method for controlling and operating a display of an electronic device according to various embodiments.

Referring to FIG. 8A, in an unfolded state 801, the electronic device 101 according to various embodiments may display a plurality of applications (e.g., 'App A' 831, 'App B' 833, and 'App C' 835) through a first display 810 (e.g., the first display 230 in FIG. 2A, the first display 430 in FIG. 4A, the first display 510 in FIG. 5, or the first display 610 in FIG. 6).

According to various embodiments, the electronic device 101 may identify a change in the display structure through at least one sensor. For example, as described above with reference to FIGS. 4A, 4B, 4C, 4D, 4E and 4F, the user may apply a force to the housing of the electronic device 101 to fold the first display 810. According to various embodiments, when an angle between the first housing structure (e.g., the first housing structure 210 in FIG. 2A) and the second housing structure (e.g., the second housing structure 220 in FIG. 2B) decreases below a reference value (e.g., 10 degrees), the electronic device 101 may determine that the electronic device 101 is in a folded state 803.

According to various embodiments, in the folded state 803, the electronic device 101 may display one application (e.g., 'App C' 835) selected from among the plurality of applications (e.g., 'App A' 831, 'App B' 833, and 'App C' 835) through a second display 820 (e.g., the second display 252 in FIG. 2A, the second display 440 in FIG. 4B, or the second display 520 in FIG. 5). According to various embodiments, the electronic device 101 may select one of the plurality of applications (e.g., 'App A' 831, 'App B' 833, and 'App C' 835), based on a user input or application priorities, and display the selected application (e.g., 'App C' 835) through the second display 820.

Figure 8B:
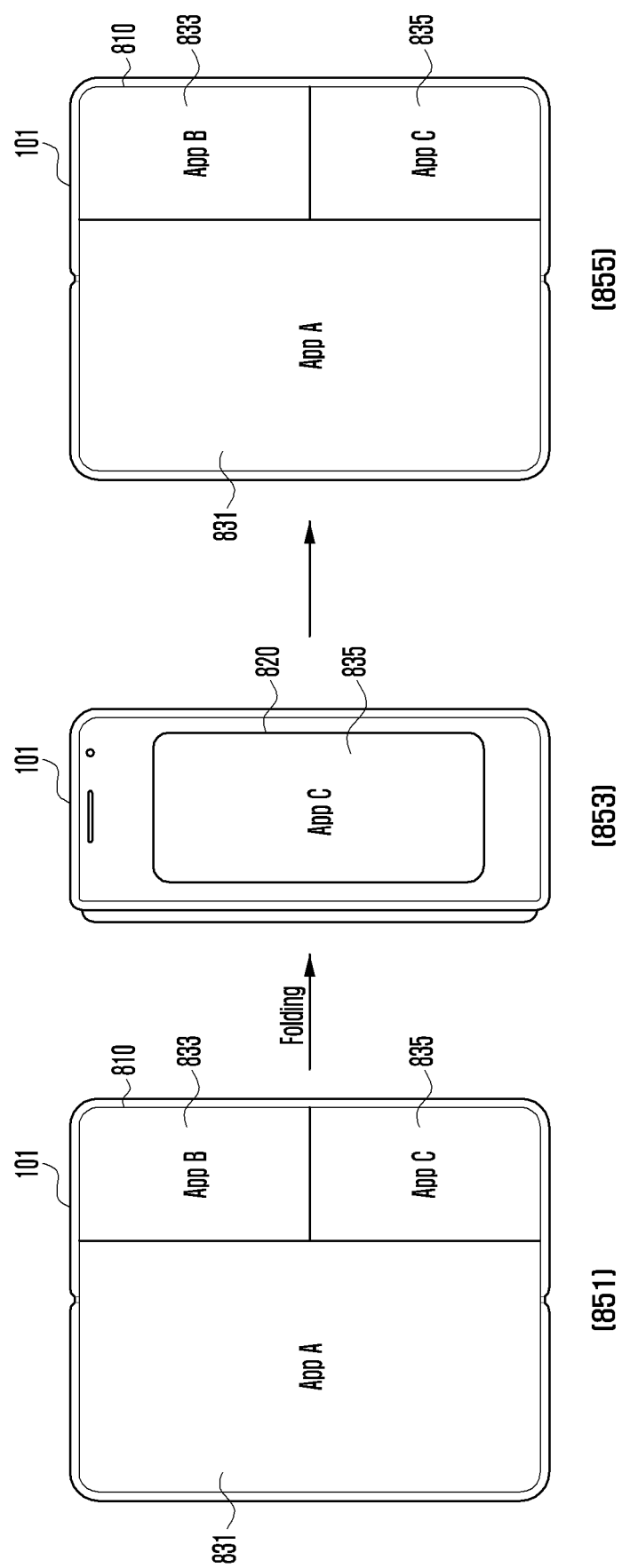
FIG. 8B is a diagram illustrating an example method for controlling and operating a display of an electronic device according to various embodiments.

FIG. 8B is a diagram illustrating an example method for controlling and operating a display of an electronic device according to various embodiments.

Referring to FIG. 8B, in an unfolded state 851, the electronic device 101 according to various embodiments may display a plurality of applications (e.g., 'App A' 831, 'App B' 833, and 'App C' 835) through the first display 810 (e.g., the first display 230 in FIG. 2A, the first display 430 in FIG. 4A, the first display 510 in FIG. 5, or the first display 610 in FIG. 6).

According to various embodiments, the electronic device 101 may identify a change in the display structure through at least one sensor. For example, as described above with reference to FIGS. 4A, 4B, 4C, 4D, 4E and 4F, the user may apply a force to the housing of the electronic device 101 to fold the first display 810. According to various embodiments, when an angle between the first housing structure (e.g., the first housing structure 210 in FIG. 2A) and the second housing structure (e.g., the second housing structure 220 in FIG. 2B) decreases below a reference value (e.g., 10 degrees), the electronic device 101 may determine that the electronic device 101 is in a folded state 853.

According to various embodiments, in the folded state 853, the electronic device 101 may display one application (e.g., 'App C' 835) selected from among the plurality of applications (e.g., 'App A' 831, 'App B' 833, and 'App C' 835) through the second display 820 (e.g., the second display 252 in FIG. 2A, the second display 440 in FIG. 4B, or the second display 520 in FIG. 5). According to various embodiments, the electronic device 101 may select one of the plurality of applications (e.g., 'App A' 831, 'App B' 833, and 'App C' 835), based on a user input or application priorities, and display the selected application (e.g., 'App C' 835) through the second display 820.

According to various embodiments, the electronic device 101 may identify a change in the display structure through at least one sensor. For example, as described above with reference to FIGS. 4A, 4B, 4C, 4D, 4E and 4F, the user may apply a force to the housing of the electronic device 101 to unfold the first display 810. According to various embodiments, when an angle between the first housing structure (e.g., the first housing structure 210 in FIG. 2A) and the second housing structure (e.g., the second housing structure 220 in FIG. 2B) is about 180 degrees, the electronic device 101 may recognize the display structure as being in the unfolded state (e.g., the first structure state) and thus determine that the electronic device 101 is in an unfolded state 855.

According to various embodiments, in the unfolded state 855, the electronic device 101 may display again the plurality of applications (e.g., 'App A' 831, 'App B' 833, and 'App C' 835) through the first display 810 (e.g., the first display 230 in FIG. 2A, the first display 430 in FIG. 4A, the first display 510 in FIG. 5, or the first display 610 in FIG. 6).

Figure 9:
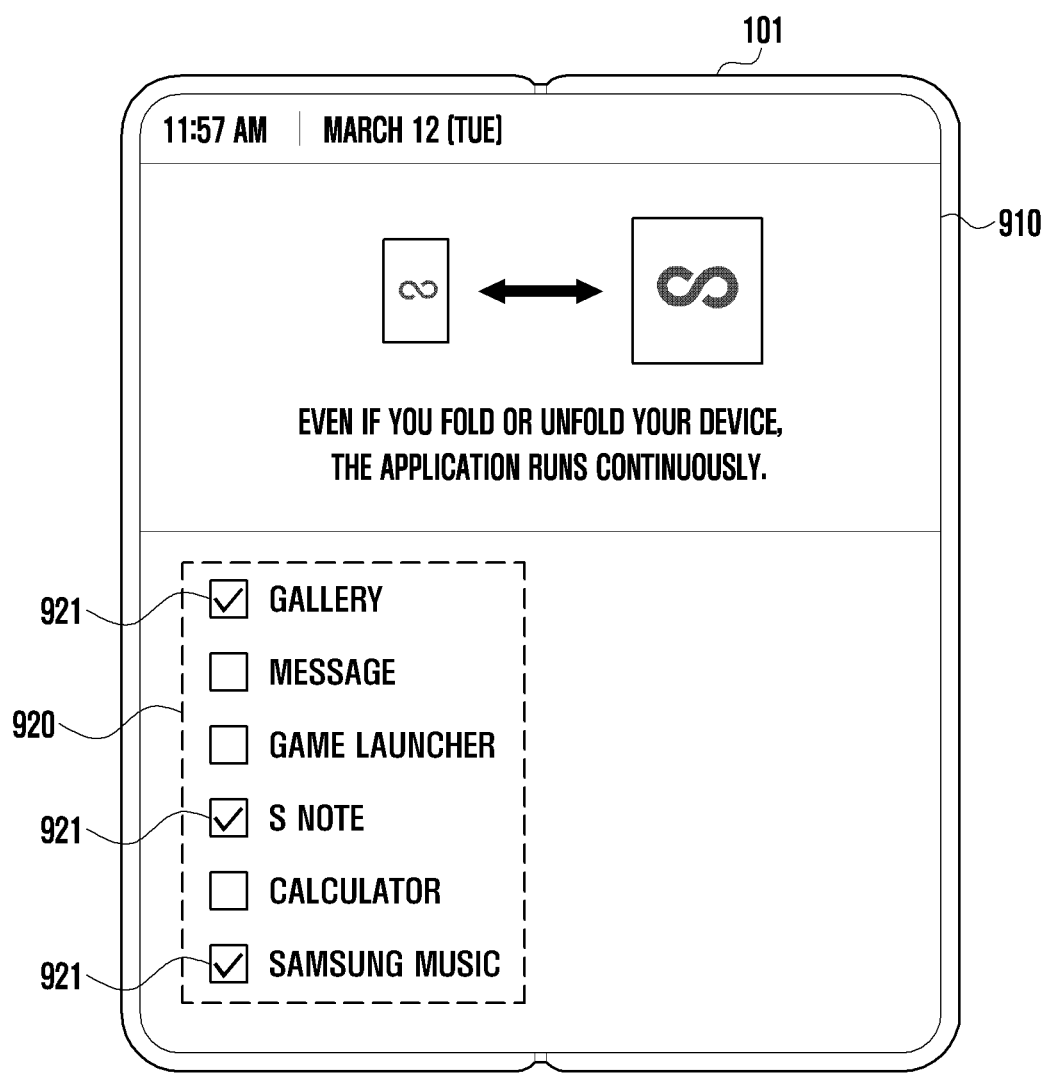
FIG. 9 is a diagram illustrating an example method for determining application setting values of an electronic device according to various embodiments.

FIG. 9 is a diagram illustrating an example method for determining application setting values of an electronic device according to various embodiments.

Referring to FIG. 9, according to various embodiments, the electronic device 101 may provide an application list 920 such that the user can designate an application priority. For example, in an unfolded state 901, the electronic device 101 may display the application list 920 through a first display 910 (e.g., the first display 230 in FIG. 2A, the first display 430 in FIG. 4A, the first display 510 in FIG. 5, or the first display 610 in FIG. 6). Although not shown, in a folded state, the electronic device 101 may display the application list 920 through a second display (e.g., the second display 252 in FIG. 2A, the second display 440 in FIG. 4B, or the second display 520 in FIG. 5).

According to various embodiments, the electronic device 101 may receive a user input of selecting at least one application 921 in the application list 920 and assign a high priority to the selected application(s) 921. Although not shown, the user may designate the priorities (e.g., high priority, normal priority, low priority, etc.) for the respective applications through the application list 920.

Figure 10:
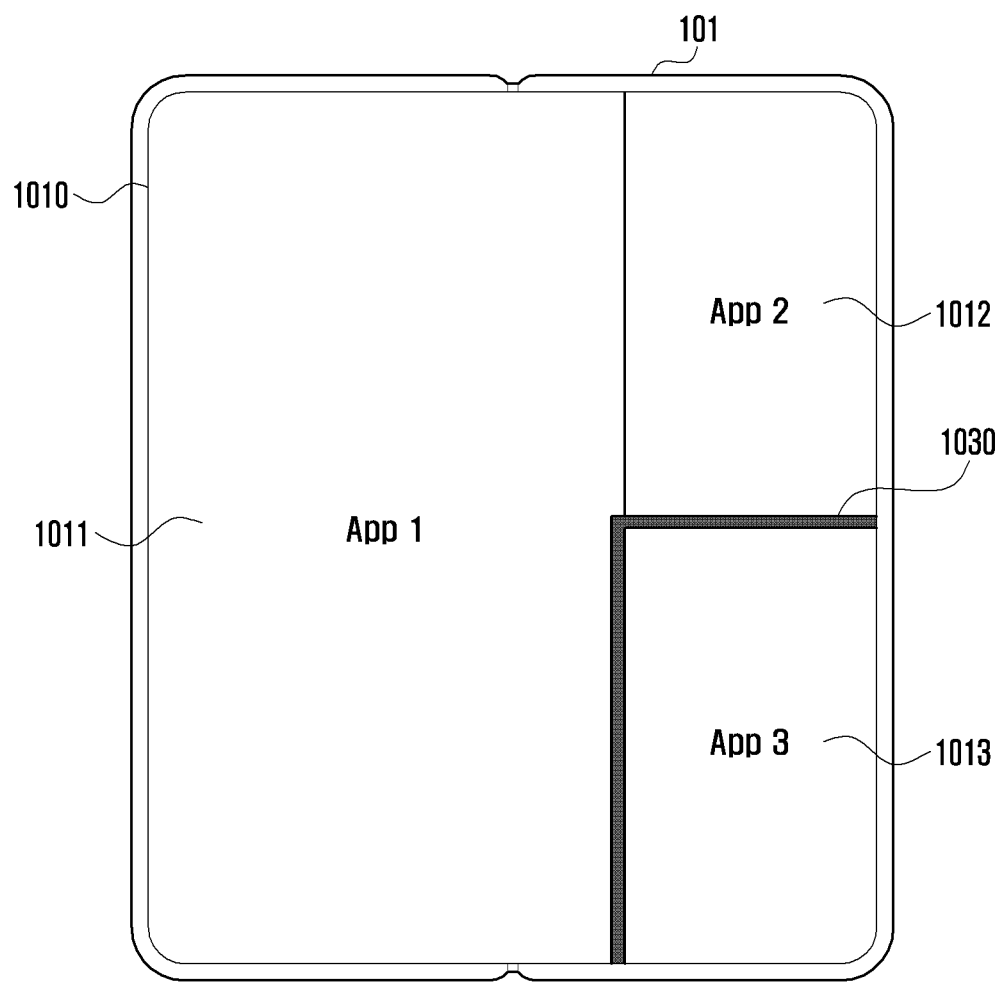
FIG. 10 is a diagram illustrating an example method for displaying a focused application of an electronic device according to various embodiments.

FIG. 10 is a diagram illustrating an example method for displaying a focused application of an electronic device according to various embodiments.

Referring to FIG. 10, in an unfolded state 1001, the electronic device 101 according to various embodiments may display a plurality of applications (e.g., 'App 1' 1011, 'App 2' 1012, and 'App 3' 1013) through a first display 1010 (e.g., the first display 230 in FIG. 2A, the first display 430 in FIG. 4A, the first display 510 in FIG. 5, or the first display 610 in FIG. 6).

According to various embodiments, the electronic device 101 may determine the priority of the application, based on focus information. The focus information may include information about a focused application estimated to be of interest by the user among the plurality of applications (e.g., 'App 1' 1011, 'App 2' 1012, and 'App 3' 1013) displayed on the first display 1010. The electronic device 101 may determine a focused application 1030, based on a user input or a characteristic of the application.

According to an embodiment, the electronic device 101 may determine, as the focused application 1030, a specific application on which user inputs are concentrated, or a specific application from which the last user input is detected. According to another embodiment, even if no user input is detected, the electronic device 101 may determine, as the focused application 1030, the last executed application or a specific application (e.g., a video application) that continuously updates a screen.

According to an embodiment, the electronic device 101 may display the focused application 1030 to be distinguished from the other applications (e.g., 'App 1' 1011 and 'App 2' 1012). For example, in order to distinctively display the focused application 1030, the electronic device 101 may process at least one of the size, color, or UI of the focused application 1030 differently from the other applications.

Figure 11A:
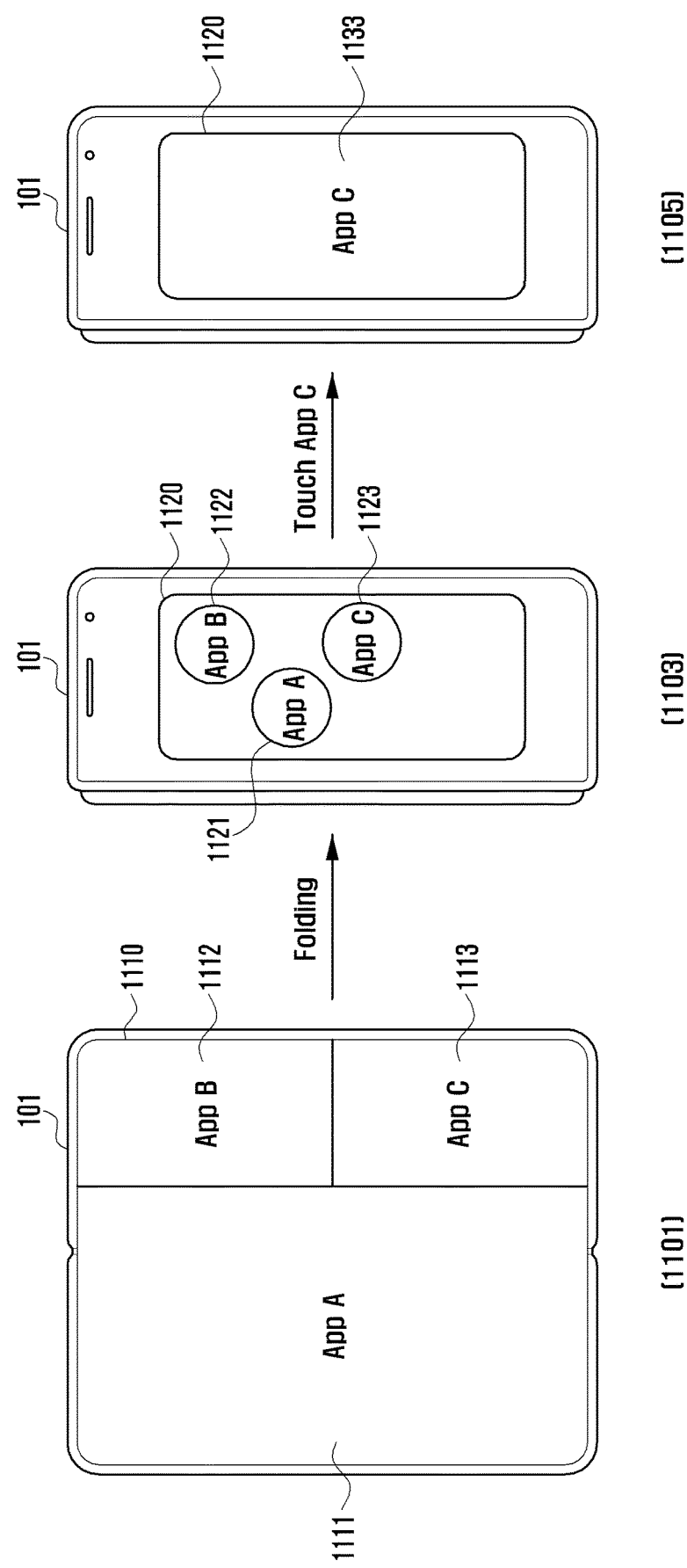
FIG. 11A is a diagram illustrating an example method for controlling and operating a display of an electronic device according to various embodiments.

FIG. 11A is a diagram illustrating an example method for controlling and operating a display of an electronic device according to various embodiments.

Referring to FIG. 11A, in an unfolded state 1101, the electronic device 101 according to various embodiments may display a plurality of applications (e.g., 'App A' 1111, 'App B' 1112, and 'App C' 1113) through a first display 1110 (e.g., the first display 230 in FIG. 2A, the first display 430 in FIG. 4A, the first display 510 in FIG. 5, or the first display 610 in FIG. 6).

According to various embodiments, the electronic device 101 may identify a change in the display structure through at least one sensor. For example, as described above with reference to FIGS. 4A, 4B, 4C, 4D, 4E and 4F, the user may apply a force to the housing of the electronic device 101 to fold the first display 1110. According to various embodiments, when an angle between a first housing structure (e.g., the first housing structure 210 in FIG. 2A) and a second housing structure (e.g., the second housing structure 220 in FIG. 2B) decreases below a reference value (e.g., 10 degrees), the electronic device 101 may determine that the electronic device 101 is in a folded state 1103.

According to various embodiments, in the folded state 1103, the electronic device 101 may display a plurality of indications (e.g., thumbnails, icons, app cards, or preview images) corresponding to the respective applications (e.g., 'App A' 1111, 'App B' 1112, and 'App C' 1113) or an application list through a second display 1120 (e.g., the second display 252 in FIG. 2A, the second display 440 in FIG. 4B, or the second display 520 in FIG. 5). For example, in the folded state 1103, the electronic device 101 may display a first indication 1121 corresponding to 'App A' 1111, a second indication 1122 corresponding to 'App B' 1112, and a third indication 1123 corresponding to 'App C' 1113 through the second display 1120. According to an embodiment, the respective indications displayed on the second display 1120 may correspond to the locations, sizes, and/or shapes of the applications displayed on the first display 1110. Thus, the user can intuitively recognize that a specific indication corresponds to a specific application.

According to various embodiments, in the folded state 1103, the electronic device 101 may receive a user input of selecting a specific application from the indications (e.g., the first indication 1121, the second indication 1122, and the third indication 1123) or the application list displayed through the second display 1120. According to various embodiments, the electronic device 101 may select one of the applications, based on the received user input of selecting a specific application. For example, the electronic device 101 may select 'App C' 1113, based on a user input of selecting the third indication 1123.

According to various embodiments, in a folded state 1105, the electronic device 101 may display the selected one application through the second display 1120. For example, the electronic device 101 may display 'App C' 1133 on the second display 1120 in the folded state 1105.

Figure 11B:
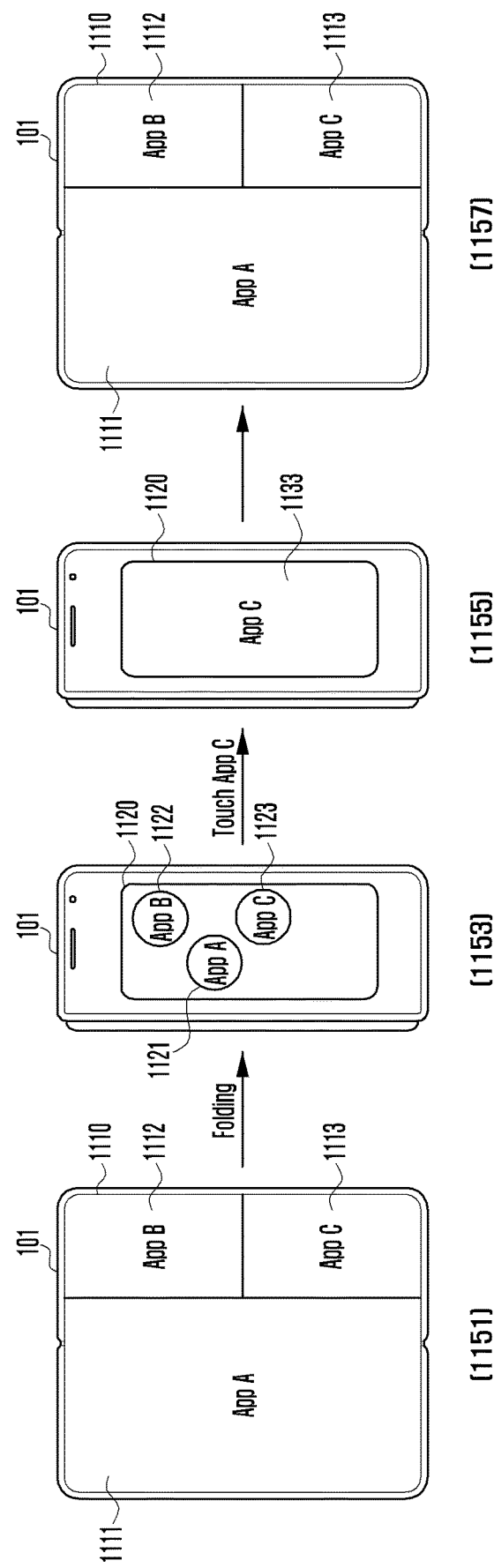
FIG. 11B is a diagram illustrating an example method for controlling and operating a display of an electronic device according to various embodiments.

FIG. 11B is a diagram illustrating an example method for controlling and operating a display of an electronic device according to various embodiments.

Referring to FIG. 11B, in an unfolded state 1151, the electronic device 101 according to various embodiments may display a plurality of applications (e.g., 'App A' 1111, 'App B' 1112, and 'App C' 1113) through the first display 1110 (e.g., the first display 230 in FIG. 2A, the first display 430 in FIG. 4A, the first display 510 in FIG. 5, or the first display 610 in FIG. 6).

According to various embodiments, the electronic device 101 may identify a change in the display structure through at least one sensor. For example, as described above with reference to FIGS. 4A, 4B, 4C, 4D, 4E and 4F, the user may apply a force to the housing of the electronic device 101 to fold the first display 1110. According to various embodiments, when an angle between a first housing structure (e.g., the first housing structure 210 in FIG. 2A) and a second housing structure (e.g., the second housing structure 220 in FIG. 2B) decreases below a reference value (e.g., 10 degrees), the electronic device 101 may determine that the electronic device 101 is in a folded state 1153.

According to various embodiments, in the folded state 1153, the electronic device 101 may display a plurality of indications (e.g., thumbnails, icons, app cards, or preview images) corresponding to the respective applications (e.g., 'App A' 1111, 'App B' 1112, and 'App C' 1113) or an application list through the second display 1120 (e.g., the second display 252 in FIG. 2A, the second display 440 in FIG. 4B, or the second display 520 in FIG. 5). For example, in the folded state 1153, the electronic device 101 may display the first indication 1121 corresponding to 'App A' 1111, the second indication 1122 corresponding to 'App B' 1112, and the third indication 1123 corresponding to 'App C' 1113 through the second display 1120. According to an embodiment, the respective indications displayed on the second display 1120 may correspond to the locations, sizes, and/or shapes of the applications displayed on the first display 1110. Thus, the user can intuitively recognize that a specific indication corresponds to a specific application.

According to various embodiments, in the folded state 1153, the electronic device 101 may receive a user input of selecting a specific application from the indications (e.g., the first indication 1121, the second indication 1122, and the third indication 1123) or the application list displayed through the second display 1120. According to various embodiments, the electronic device 101 may select one of the applications, based on the received user input of selecting a specific application. For example, the electronic device 101 may select 'App C' 1113, based on a user input of selecting the third indication 1123.

According to various embodiments, in a folded state 1155, the electronic device 101 may display the selected one application through the second display 1120. For example, the electronic device 101 may display 'App C' 1133 on the second display 1120 in the folded state 1155.

According to various embodiments, the electronic device 101 may identify a change in the display structure through at least one sensor. For example, as described above with reference to FIGS. 4A, 4B, 4C, 4D, 4E and 4F, the user may apply a force to the housing of the electronic device 101 to unfold the first display 1110. According to various embodiments, when an angle between the first housing structure (e.g., the first housing structure 210 in FIG. 2A) and the second housing structure (e.g., the second housing structure 220 in FIG. 2B) is about 180 degrees, the electronic device 101 may recognize the display structure as being in the unfolded state (e.g., the first structure state) and thus determine that the electronic device 101 is in an unfolded state 1157.

According to various embodiments, in the unfolded state 1157, the electronic device 101 may display again the plurality of applications (e.g., 'App A' 1111, 'App B' 1112, and 'App C' 1113) through the first display 1110 (e.g., the first display 230 in FIG. 2A, the first display 430 in FIG. 4A, the first display 510 in FIG. 5, or the first display 610 in FIG. 6).

Figure 11C:
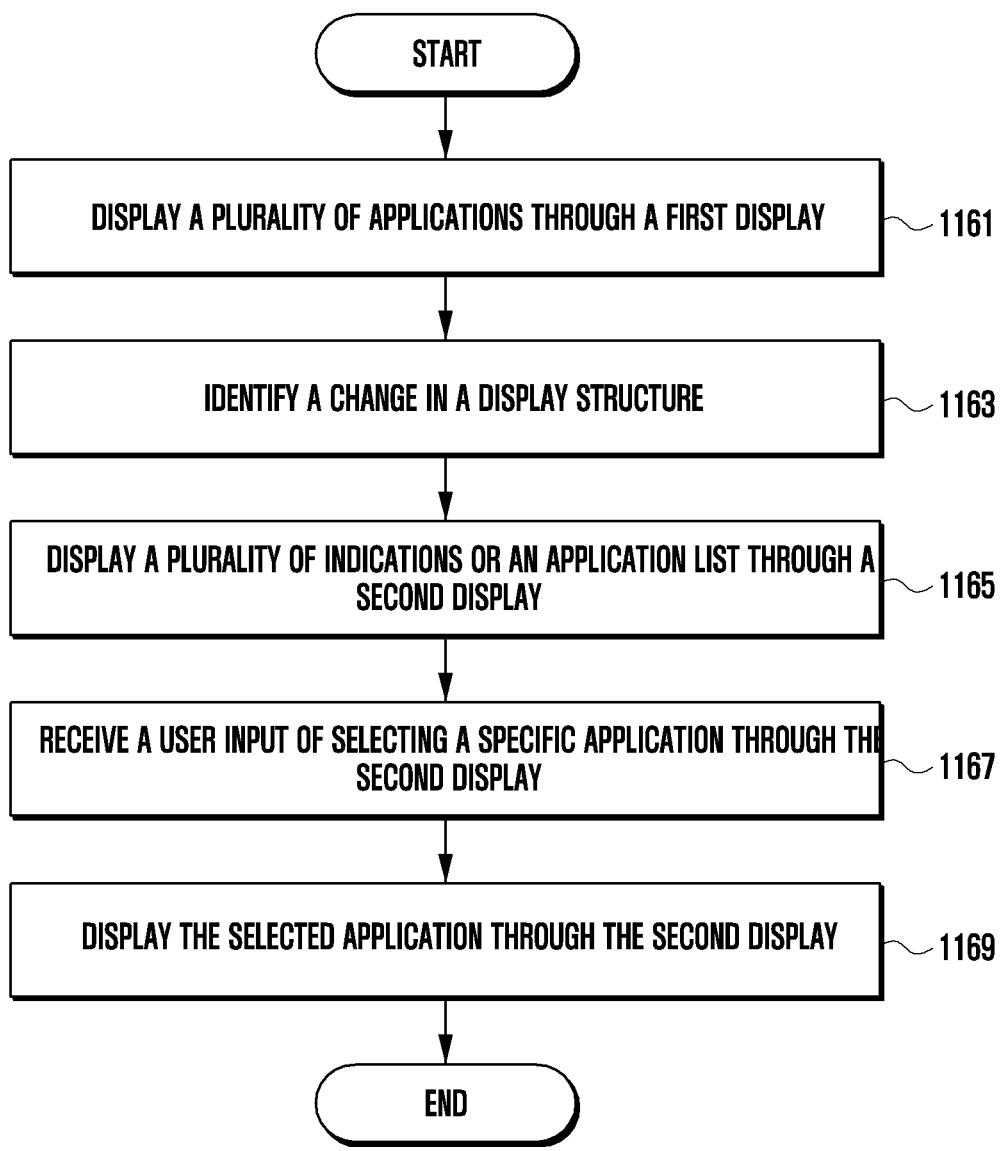
FIG. 11C is a flowchart illustrating an example method for controlling and operating a display of an electronic device according to various embodiments.

FIG. 11C is a flowchart illustrating an example method for controlling and operating a display of an electronic device according to various embodiments.

Operations 1161, 1163, 1165, 1167 and 1169 shown in FIG. 11C will be described with reference to the configuration of the electronic device 101 of FIG. 1.

Referring to FIG. 11C, at operation 1161, the processor 120 of the electronic device 101 according to various embodiments may control the electronic device 101 to display a plurality of applications through a first display (e.g., the first display 230 in FIG. 2A, the first display 430 in FIG. 4A, the first display 510 in FIG. 5, or the first display 610 of FIG. 6) in a state where a display structure is a first structure (e.g., an unfolded state). The operation 1161 is similar to the above-described operation 710 of FIG. 7, accordingly a detailed description thereof may not be repeated here.

At operation 1163, the processor 120 of the electronic device 101 according to various embodiments may identify, through at least one sensor, a change in the display structure (e.g., change in folded or unfolded state). The operation 1163 is similar to the above-described operation 720 of FIG. 7, accordingly a detailed description thereof may not be repeated here.

At operation 1165, the processor 120 of the electronic device 101 according to various embodiments may display a plurality of indications (e.g., thumbnails, icons, app cards, or preview images) corresponding to the respective applications or a list of the applications through a second display (e.g., the second display 252 in FIG. 2A, the second display 440 in FIG. 4B, or the second display 520 in FIG. 5) in a state where the display structure is a second structure (e.g., a folded state).

At operation 1167, the processor 120 of the electronic device 101 according to various embodiments may receive a user input of selecting a specific application from the plurality of indications or the application list displayed through the second display. According to various embodiments, the processor 120 may select one of the plurality of applications, based on the received user input of selecting the specific application.

At operation 1169, the processor 120 of the electronic device 101 according to various embodiments may display the selected one application through the second display while the display structure is in the second structure state. The operation 1169 is similar to the above-described operation 740 of FIG. 7, accordingly a detailed description thereof may not be repeated here.

Figure 12:
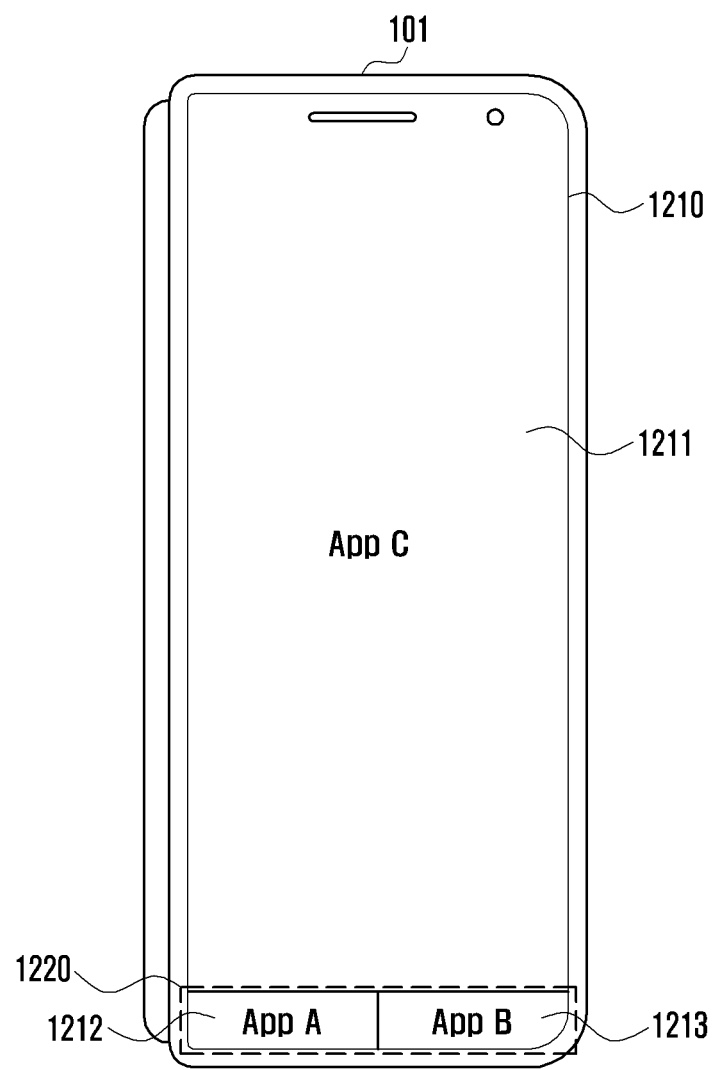
FIG. 12 is a diagram illustrating an example method for displaying applications of an electronic device according to various embodiments.

FIG. 12 is a diagram illustrating an example method for displaying applications of an electronic device according to various embodiments.

Referring to FIG. 12, in an unfolded state, the electronic device 101 may select one of a plurality of applications being displayed through a first display (e.g., the first display 230 in FIG. 2A, the first display 430 in FIG. 4A, the first display 510 in FIG. 5, or the first display 610 in FIG. 6). Thereafter, in a folded state 1201, the electronic device 101 may display the selected one application (e.g., 'App C' 1211) through a second display 1210 (e.g., the second display 252 in FIG. 2A, the second display 440 in FIG. 4B, or the second display 520 in FIG. 5).

According to various embodiments, the electronic device 101 may display an application selection bar 1220 together with the selected one application (e.g., 'App C' 1211) through the second display 1210. The application selection bar 1220 may include, for example, information about the other applications (e.g., 'App A' 1212 and 'App B' 1213) which were not selected from among the plurality of applications. When the user selects a specific application through the application selection bar 1220, the processor 120 may switch the currently displayed application (e.g., 'App C' 1211) to the selected application (e.g., 'App A' 1212 or 'App B' 1213).

Figure 13:
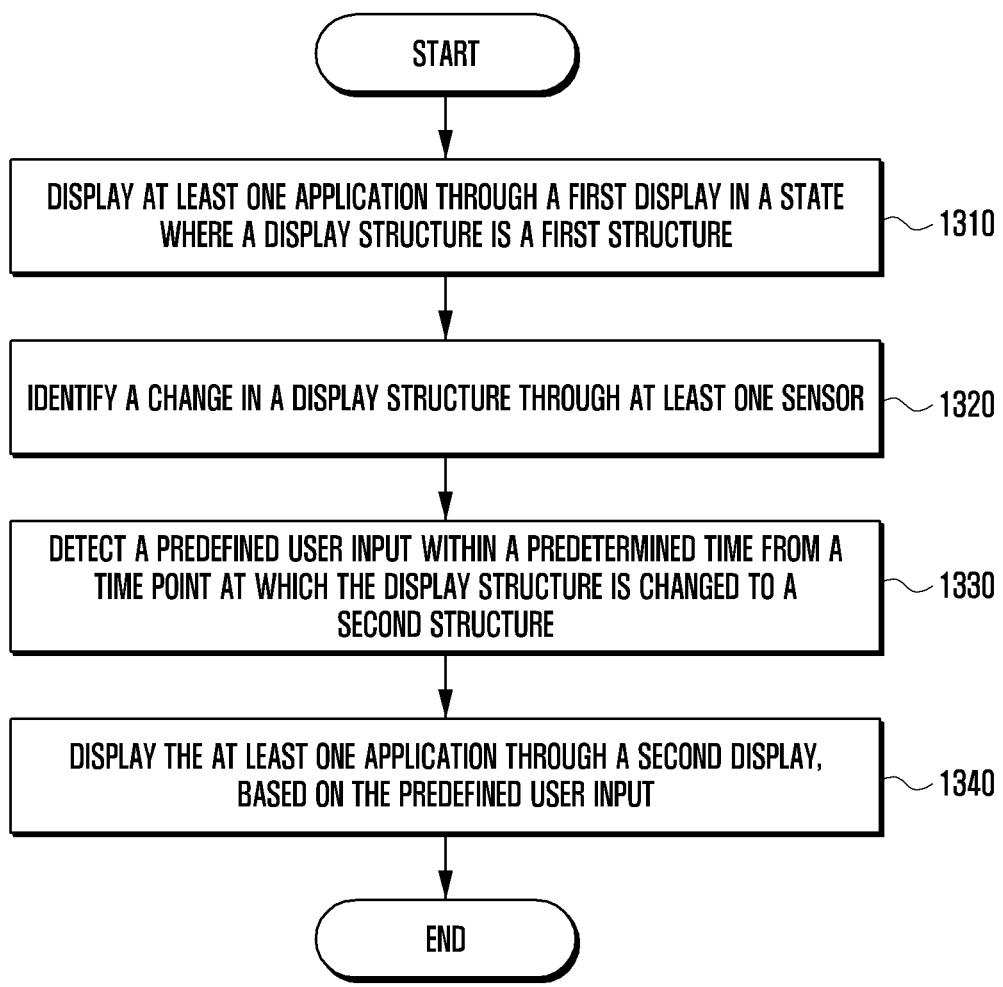
FIG. 13 is a flowchart illustrating an example method for controlling and operating a display of an electronic device according to various embodiments.

FIG. 13 is a flowchart illustrating an example method for controlling and operating a display of an electronic device according to various embodiments.

Operations 1310, 1320, 1330 and 1340 shown in FIG. 13 will be described with reference to the configuration of the electronic device 101 of FIG. 1.

Referring to FIG. 13, at operation 1310, the processor 120 of the electronic device 101 according to various embodiments may display at least one application through a first display (e.g., the first display 230 in FIG. 2A, the first display 430 in FIG. 4A, the first display 510 in FIG. 5, or the first display 610 of FIG. 6) in a state where a display structure is a first structure (e.g., an unfolded state).

According to various embodiments, the processor 120 may display one or more application screens through the first display. For example, the processor 120 may support a full screen mode for displaying one application screen through the entire screen of the first display, or a split screen mode for splitting the screen of the first display into a plurality of regions and then displaying different application screens on the respective regions.

At operation 1320, the processor 120 of the electronic device 101 according to various embodiments may identify, through at least one sensor, a change in the display structure.

According to various embodiments, the processor 120 may identify a pattern of a folding gesture from the sensor (e.g., an acceleration sensor, a gyro sensor, or a magnet sensor) disposed in a first housing structure (e.g., the first housing structure 210 in FIG. 2A) and/or a second housing structure (e.g., the second housing structure 220 in FIG. 2B). For example, as previously described with reference to FIGS. 4A, 4B, 4C, 4D, 4E and 4F, the processor 120 may recognize that a first area (e.g., the first area 231a in FIG. 2A) and a second area (e.g., the second area 231b in FIG. 2A) of the first display are folded to face each other.

According to various embodiments, when the electronic device 100 (or the first display thereof) is folded, the processor 120 may detect the folding gesture from a change in angle between the first and second housing structures covering the first and second areas of the first display, respectively, which are disposed at both sides of a folding area (e.g., the folding area 231c in FIG. 2A). For example, when the angle between the first and second housing structures is about 180 degrees, the processor 120 may recognize the display structure as being in the unfolded state (e.g., the first structure state). If an angle change occurs in the unfolded state, the processor 120 may determine that the folding gesture is started. Thereafter, when the angle decreases below a reference value (e.g., 10 degrees), the processor 120 may determine that the display structure is in the folded state (e.g., the second structure state).

At operation 1330, the processor 120 of the electronic device 101 according to various embodiments may detect a predefined user input within a predetermined time from a time point at which the display structure is changed to the second structure (e.g., a folded state).

According to various embodiments, in a state where the display structure is the second structure, the processor 120 may operate the second display in a power saving mode (e.g., screen off) or in an always-on-display (AOD) mode displaying only brief information such as time. For example, if the second display is operated in the power saving mode or the AOD mode while the display structure is the first structure (e.g., the unfolded state), the processor 120 may maintain the power saving mode or the AOD mode of the second display. In another example, if the second display has been already activated while the display structure is the first structure, the processor 120 may operate the second display to be entered in the power saving mode or the AOD mode immediately after the display structure is changed to the second structure.

The time point at which the display structure is changed to the second structure may be, for example, a time point when the folding gesture is started or recognized, a time point when the folding is completed, or a time point when the second display starts operating in the power saving mode or the AOD mode.

According to various embodiments, in order to provide the continuity of an application, the processor 120 may start counting a time from the time point when the display structure is changed to the second structure, and check whether a predefined user input is detected within a predetermined time (e.g., N seconds). The predefined user input may include, for example, at least one of a touch input on the second display, a press input of a physical button (e.g., a power button), or a voice input. The predetermined time may indicate, for example, a particular time designated by the user or designer of the electronic device. According to various embodiments, a method for providing the continuity of an application may be implemented in a bidirectional form or a unidirectional form. This may be selected according to setting or by the user.

According to various embodiments, the method for providing the continuity of an application in the bidirectional form may refer, for example, to continuously displaying an application screen, having been displayed on the first display 230, on the second display 252 in response to a change of the display structure to the folded state, and also continuously displaying an application screen, having been displayed on the second display 252, on the first display 230 in response to a change of the display structure to the unfolded state.

According to various embodiments, the method for providing the continuity of an application in the unidirectional form may refer, for example, to not displaying an application screen, having been displayed on the first display 230, on the second display 252 in response to a change of the display structure to the folded state, or not displaying an application screen, having been displayed on the second display 252, on the first display 230 in response to a change of the display structure to the unfolded state.

According to an embodiment, the processor 120 may maintain the execution of at least one application, having been displayed through the first display, for a certain time from the time point when the display structure is changed to the second structure. For example, in order to provide the continuity of the application(s) even when the display is switched, the processor 120 may continue to execute the application(s) for a certain time even when the application is not displayed.

At operation 1340, the processor 120 of the electronic device 101 according to various embodiments may display the at least one application through the second display, based on the predefined user input.

Where one application is displayed on the first display, the processor 120 may display the one application through the second display.

Where a plurality of applications are displayed on the first display, the processor 120 may select one of the plurality of applications and display the selected application through the second display. The processor 120 may select one of the plurality of applications, based on a user input or priorities of the applications. If there is no application selected, the processor 120 may display a main application through the second display or maintain the power saving mode or the AOD mode of the second display.

According to various embodiments, the processor 120 may display an application selection bar together with the selected one application through the second display. The application selection bar may include, for example, information about the other applications unselected from among the plurality of applications. When the user selects a specific application through the application selection bar, the processor 120 may switch the currently displayed application to the selected application.

Figure 14A:
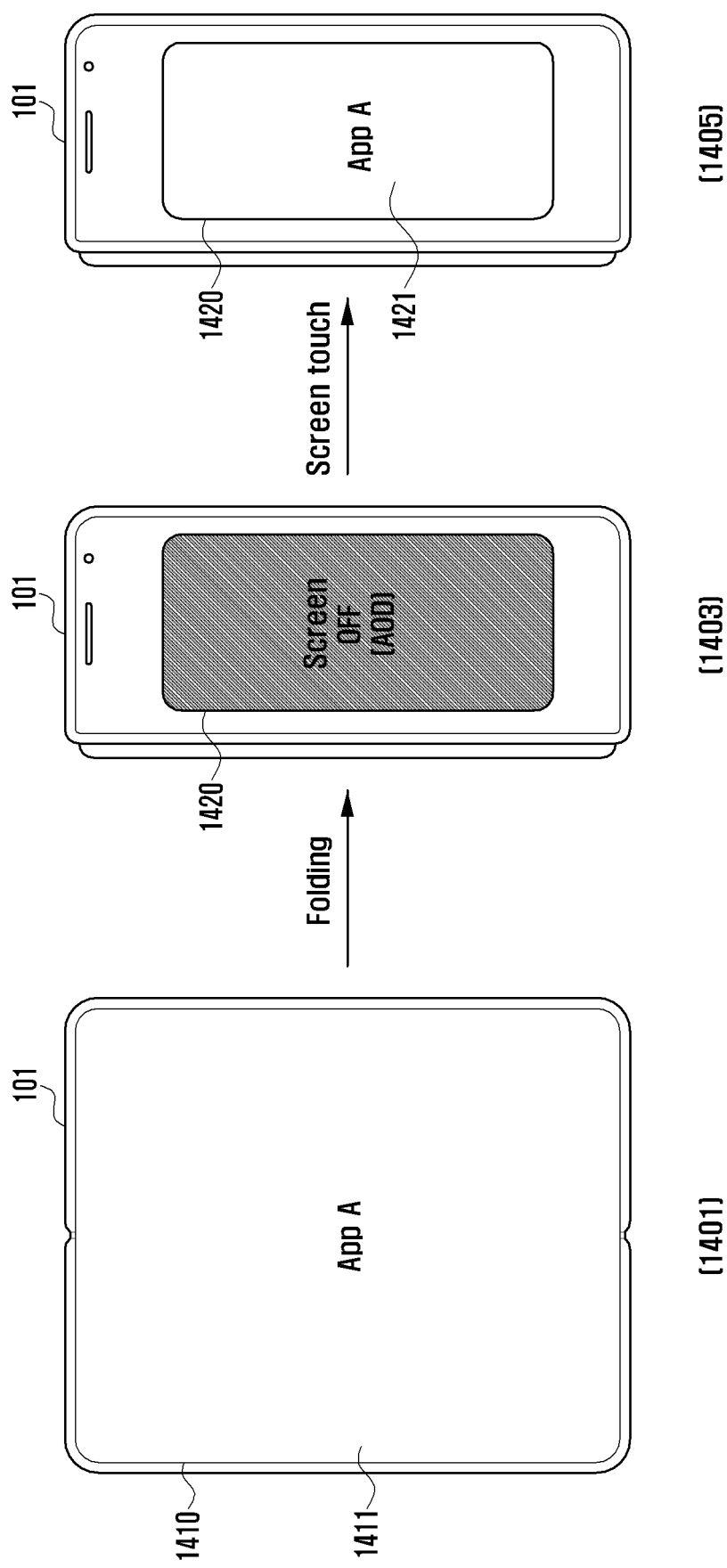
FIG. 14A is a diagram illustrating an example method for controlling and operating a display of an electronic device according to various embodiments.

FIG. 14A is a diagram illustrating an example method for controlling and operating a display of an electronic device according to various embodiments.

Referring to FIG. 14A, in an unfolded state 1401, the electronic device 101 according to various embodiments may display at least one application (e.g., 'App A' 1411) through a first display 1410 (e.g., the first display 230 in FIG. 2A, the first display 430 in FIG. 4A, the first display 510 in FIG. 5, or the first display 610 in FIG. 6).

According to various embodiments, the electronic device 101 may identify a change in the display structure through at least one sensor. For example, as described above with reference to FIGS. 4A, 4B, 4C, 4D, 4E and 4F, the user may apply a force to the housing of the electronic device 101 to fold the first display 1410. According to various embodiments, when an angle between the first housing structure (e.g., the first housing structure 210 in FIG. 2A) and the second housing structure (e.g., the second housing structure 220 in FIG. 2B) decreases below a reference value (e.g., 10 degrees), the electronic device 101 may determine that the electronic device 101 is in a folded state 1403.

According to various embodiments, in the folded state 1403, the electronic device 101 may operate a second display 1420 (e.g., the second display 252 in FIG. 2A, the second display 440 in FIG. 4B, or the second display 520 in FIG. 5) in a power saving mode (e.g., screen off) or in an always-on-display (AOD) mode displaying only brief information such as time. For example, if the second display 1420 has been operated in the power saving mode or the AOD mode in the unfolded state, the electronic device 101 may maintain the power saving mode or the AOD mode of the second display 1420 in the folded state 1403. In another example, if the second display 1420 has been already activated in the unfolded state, the electronic device 101 may operate the second display 1420 to be entered in the power saving mode or the AOD mode immediately after being changed to the folded state 1403.

According to various embodiments, in order to provide the continuity of an application, the electronic device 101 may start counting a time from the time point of being changed to the folded state 1403, and check whether a predefined user input is detected within a predetermined time (e.g., N seconds). The predefined user input may include, for example, at least one of a touch input on the second display, a press input of a physical button (e.g., a power button), or a voice input. The predetermined time may indicate, for example, a particular time designated by the user or designer of the electronic device.

According to various embodiments, in the folded state 1405, the electronic device 101 may display the at least one application (e.g., 'App A' 1421) through the second display 1420, based on the predefined user input.

Figure 14B:
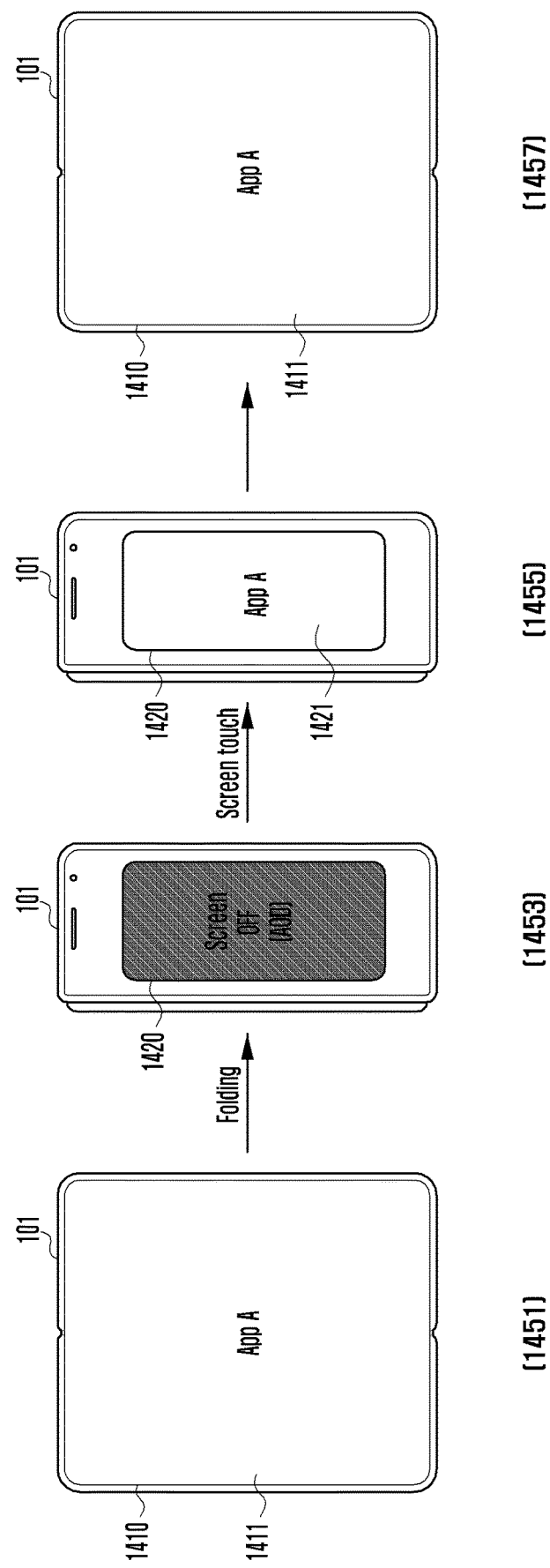
FIG. 14B is a diagram illustrating an example method for controlling and operating a display of an electronic device according to various embodiments.

FIG. 14B is a diagram illustrating an example method for controlling and operating a display of an electronic device according to various embodiments.

Referring to FIG. 14B, in an unfolded state 1451, the electronic device 101 according to various embodiments may display at least one application (e.g., 'App A' 1411) through the first display 1410 (e.g., the first display 230 in FIG. 2A, the first display 430 in FIG. 4A, the first display 510 in FIG. 5, or the first display 610 in FIG. 6).

According to various embodiments, the electronic device 101 may identify a change in the display structure through at least one sensor. For example, as described above with reference to FIGS. 4A, 4B, 4C, 4D, 4E and 4F, the user may apply a force to the housing of the electronic device 101 to fold the first display 1410. According to various embodiments, when an angle between the first housing structure (e.g., the first housing structure 210 in FIG. 2A) and the second housing structure (e.g., the second housing structure 220 in FIG. 2B) decreases below a reference value (e.g., 10 degrees), the electronic device 101 may determine that the electronic device 101 is in a folded state 1453.

According to various embodiments, in the folded state 1453, the electronic device 101 may operate the second display 1420 (e.g., the second display 252 in FIG. 2A, the second display 440 in FIG. 4B, or the second display 520 in FIG. 5) in a power saving mode (e.g., screen off) or in an always-on-display (AOD) mode displaying only brief information such as time. For example, if the second display 1420 has been operated in the power saving mode or the AOD mode in the unfolded state, the electronic device 101 may maintain the power saving mode or the AOD mode of the second display 1420 in the folded state 1453. In another example, if the second display 1420 has been already activated in the unfolded state, the electronic device 101 may operate the second display 1420 to be entered in the power saving mode or the AOD mode immediately after being changed to the folded state 1453.

According to various embodiments, in order to provide the continuity of an application, the electronic device 101 may start counting a time from the time point of being changed to the folded state 1453, and check whether a predefined user input is detected within a predetermined time (e.g., N seconds). The predefined user input may include, for example, at least one of a touch input on the second display, a press input of a physical button (e.g., a power button), or a voice input. The predetermined time may indicate, for example, a particular time designated by the user or designer of the electronic device.

According to various embodiments, in the folded state 1455, the electronic device 101 may display the at least one application (e.g., 'App A' 1421) through the second display 1420, based on the predefined user input.

According to various embodiments, the electronic device 101 may identify a change in the display structure through at least one sensor. For example, as described above with reference to FIGS. 4A, 4B, 4C, 4D, 4E and 4F, the user may apply a force to the housing of the electronic device 101 to unfold the first display 1410. According to various embodiments, when an angle between the first housing structure (e.g., the first housing structure 210 in FIG. 2A) and the second housing structure (e.g., the second housing structure 220 in FIG. 2B) is about 180 degrees, the electronic device 101 may recognize the display structure as being in the unfolded state (e.g., the first structure state) and thus determine that the electronic device 101 is in an unfolded state 1457.

According to various embodiments, in the unfolded state 1457, the electronic device 101 may display again the at least one application (e.g., 'App A' 1421) through the first display 1410 (e.g., the first display 230 in FIG. 2A, the first display 430 in FIG. 4A, the first display 510 in FIG. 5, or the first display 610 in FIG. 6).

Figure 14C:
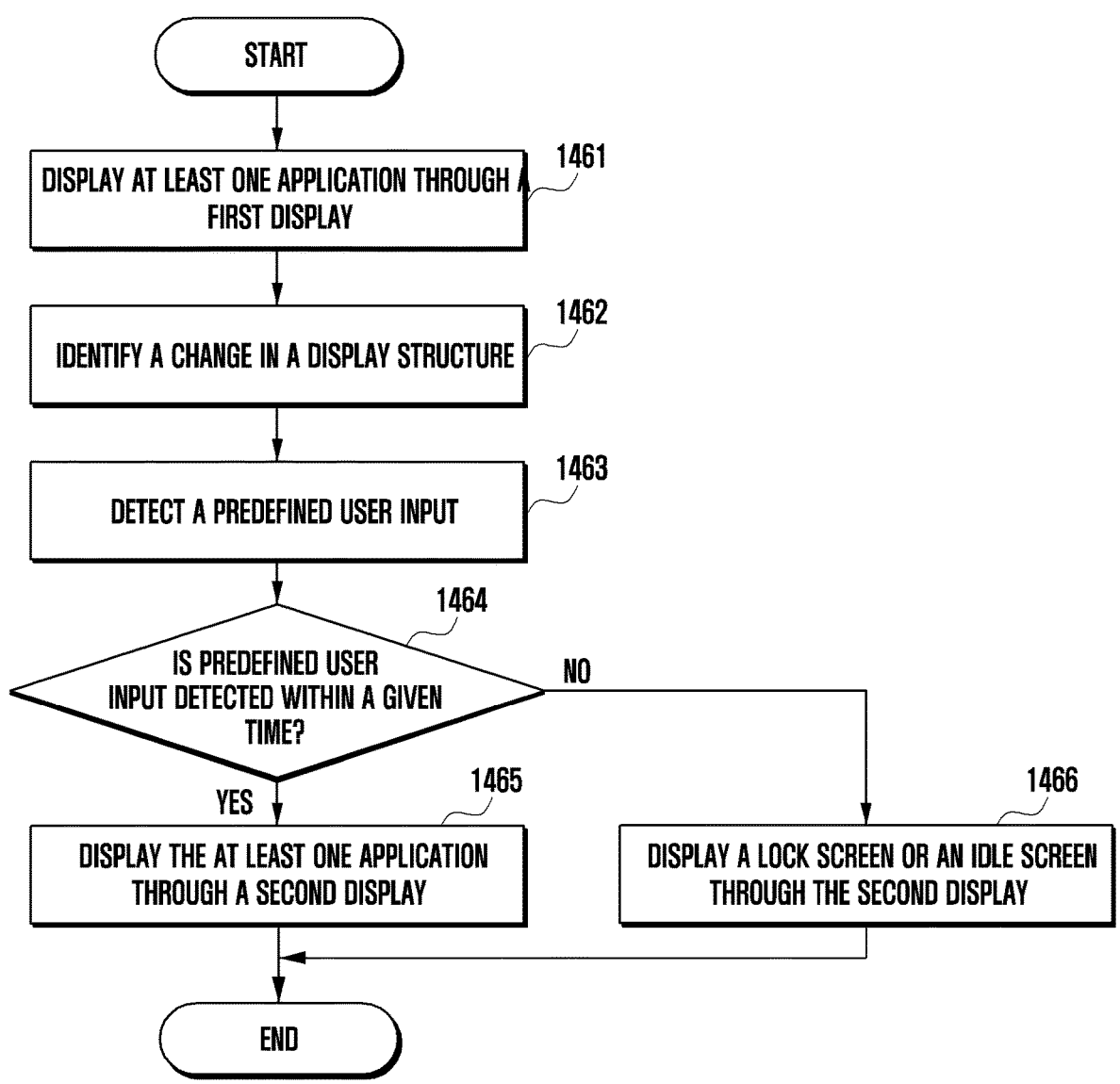
FIG. 14C is a flowchart illustrating an example method for controlling and operating a display of an electronic device according to various embodiments.

FIG. 14C is a flowchart illustrating an example method for controlling and operating a display of an electronic device according to various embodiments.

Operations 1461, 1462, 1463, 1464, 1465 and 1466 shown in FIG. 14C will be described with reference to the configuration of the electronic device 101 of FIG. 1.

Referring to FIG. 14C, at operation 1461, the processor 120 of the electronic device 101 according to various embodiments may control the electronic device 101 to display at least one application through a first display (e.g., the first display 230 in FIG. 2A, the first display 430 in FIG. 4A, the first display 510 in FIG. 5, or the first display 610 of FIG. 6) in a state where a display structure is a first structure (e.g., an unfolded state). The operation 1461 is similar to the above-described operation 1310 of FIG. 13, accordingly a detailed description thereof may not be repeated here.

At operation 1462, the processor 120 of the electronic device 101 according to various embodiments may identify a change in the display structure through at least one sensor. The operation 1462 is similar to the above-described operation 1320 of FIG. 13, accordingly a detailed description thereof may not be repeated here. According to various embodiments, when a change of the display structure is identified through at least one sensor at the operation 1462, the processor 120 of the electronic device 101 may operate a second display (e.g., the second display 252 in FIG. 2A, the second display 440 in FIG. 4B, or the second display 520 in FIG. 5) in the power saving mode or the AOD mode.

At operation 1463, the processor 120 of the electronic device 101 according to various embodiments may detect a predefined user input. For example, the predefined user input may include at least one of a touch input on the second display, a press input of a physical button (e.g., a power button), or a voice input.

According to various embodiments, the predefined user input may include a user's continuous use intention to be detected through facial recognition or iris recognition for the user. The electronic device 101 may detect the user's continuous use intention by using the camera module 180 or the sensor module 176.

At operation 1464, the processor 120 of the electronic device 101 according to various embodiments may determine whether the predefined user input is detected within a predetermined time from a time point at which the display structure is changed to the second structure. The predetermined time may refer to, for example, a particular time designated by the user or designer of the electronic device.

According to various embodiments, at the operation 1464, depending on the type of the at least one application displayed through the first display, the processor 120 of the electronic device 101 may continuously display an application execution screen through the second display irrespective of whether the predefined user input has been detected within the predetermined time. For example, the type of an application to be displayed through the second display regardless of whether the user input is entered within the predetermined time may be a voice call application, a video call application, or an internet-based call application (e.g., Skype).

According to various embodiments, at the operation 1464, irrespective of whether the predefined user input has been detected within the predetermined time, the processor 120 of the electronic device 101 may identify whether an application displayed through the first display is a specific application. If the displayed application is the specific application, the processor 120 may continuously display an execution screen of the specific application through the second display. For example, the specific application to be displayed through the second display regardless of whether the user input is entered within the predetermined time may be a voice call application, a video call application, or an internet-based call application (e.g., Skype).

If it is determined at the operation 1464 that the predefined user input is detected within the predetermined time from the time point at which the display structure is changed to the second structure ("Yes" in operation 1464), the processor 120 of the electronic device 101 according to various embodiments may display, at operation 1465, the at least one application through the second display. The operation 1465 is similar to the above-described operation 1340 of FIG. 13, accordingly a detailed description thereof may not be repeated here.

According to various embodiments, the operation 1465 is to provide the continuity of an application. At the operation 1465, the processor 120 may start counting a time from the time point when the display structure is changed to the second structure, and check whether the predefined user input is detected within the predetermined time (e.g., N seconds). A method for providing the continuity of an application may be implemented in a bidirectional form or a unidirectional form, which may be selected according to setting or by the user.

According to various embodiments, the method for providing the continuity of an application in the bidirectional form may refer, for example, to continuously displaying an application screen, having been displayed on the first display, on the second display in response to a change of the display structure to the folded state, and also continuously displaying an application screen, having been displayed on the second display, on the first display in response to a change of the display structure to the unfolded state.

According to various embodiments, the method for providing the continuity of an application in the unidirectional form may refer, for example, to not displaying an application screen, having been displayed on the first display, on the second display in response to a change of the display structure to the folded state, or not displaying an application screen, having been displayed on the second display, on the first display in response to a change of the display structure to the unfolded state.

If it is determined at the operation 1464 that the predefined user input is detected after the predetermined time from the time point at which the display structure is changed to the second structure ("No" in operation 1464), the processor 120 of the electronic device 101 according to various embodiments may display, at operation 1466, a lock screen or an idle screen through the second display.

After displaying the lock screen or the idle screen through the second display at the operation 1466, the processor 120 of the electronic device 101 according to various embodiments may receive a user input for releasing the lock screen or the idle screen through the second display. The processor 120 may display a home screen, a recently executed application screen, or a screen of at least one application (e.g., an application selected by a user input or an application designated by priority) on the second display.

Figure 15:
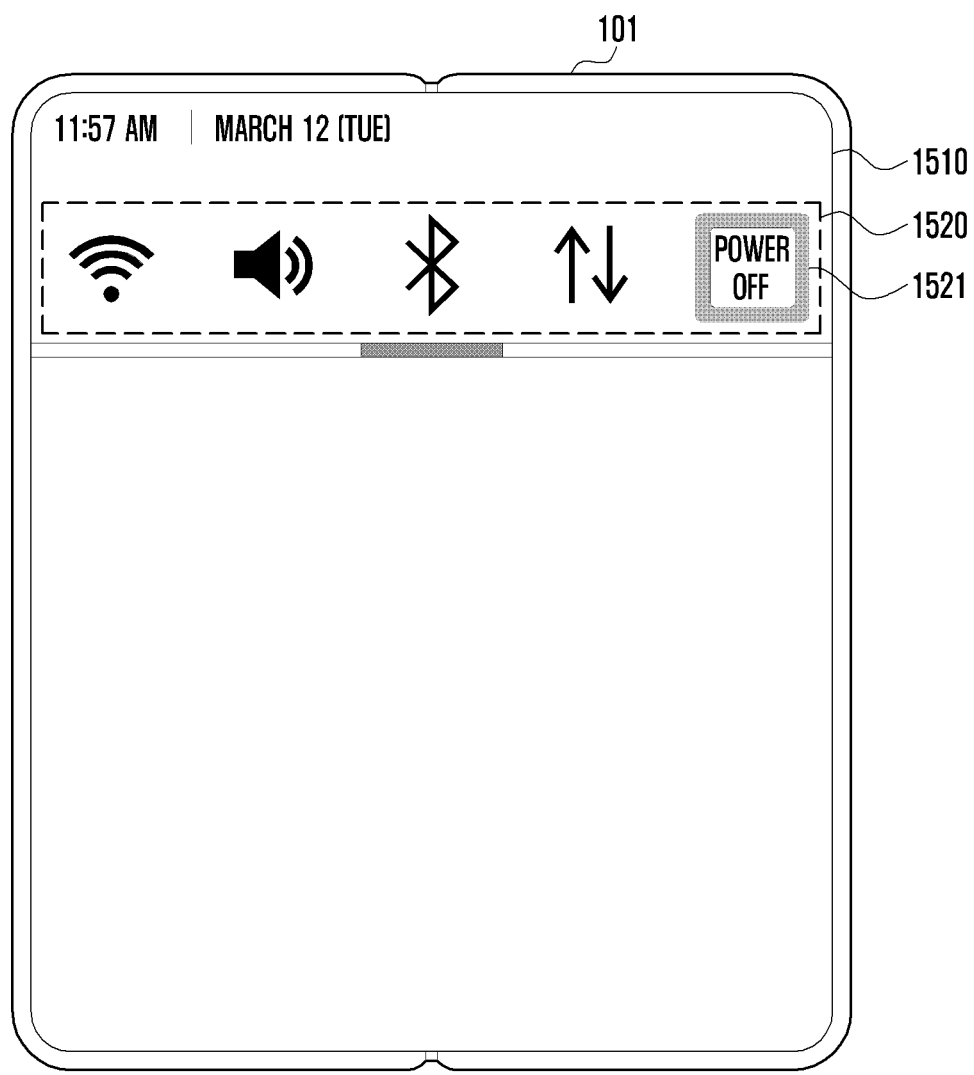
FIG. 15 is a diagram illustrating an example user interface for changing settings of an electronic device according to various embodiments.

FIG. 15 is a diagram illustrating an example user interface for changing settings of an electronic device according to various embodiments.

The electronic device 101 according to various embodiments may set the power of a second display 1510 (e.g., the second display 252 in FIG. 2A, the second display 440 in FIG. 4B, or the second display 520 in FIG. 5) to be turned on or off in response to a folding gesture. For example, the user may change the power on/off setting of the second display 1510 through a setting menu of the electronic device 101.

Referring to FIG. 15, the electronic device 101 may provide a power setting button 1521 for the second display 1510 through a menu bar 1520 in an unfolded state 1501. Using the second display power setting button 1521, the user may change the power on/off setting of the second display 1510.

For example, when the second display power setting button 1521 is 'on', the electronic device 101 may activate the second display 1510 in a state where the electronic device 101 is folded. In another example, when the second display power setting button 1521 is 'off', the electronic device 101 may deactivate the second display 1510 or maintain the deactivated state of the second display 1510 in a state where the electronic device 101 is folded.

According to various embodiments, depending on whether the second display power is set to be turn on or off, the above-described operations 1463 and 1464 for detecting the predefined user input within the predetermined time may be performed or not.

According to various example embodiments of the disclosure, an electronic device may include a foldable housing including a hinge; a first housing connected to the hinge, and including a first surface facing a first direction and a second surface facing a second direction opposite the first direction; and a second housing connected to the hinge and configured to be foldable with the first housing around the hinge, the second housing including a third surface facing a third direction and a fourth surface facing a fourth direction opposite the third direction, wherein the first surface faces the third surface in a completely folded state. The electronic device may further include a first display extending from the first surface to the third surface to define the first and third surfaces; a second display viewable through at least a part of the second or fourth surface; at least one sensor; a processor disposed in the first housing or the second housing; and a memory 130 operatively connected to the processor 120, wherein the memory 130 stores instructions which, when executed, cause the processor to control the electronic device to: display a plurality of applications on the first display in an unfolded state, select at least one of the plurality of applications based on an input or priorities of the plurality of applications, based on the at least one sensor detecting that the foldable housing is changed from the unfolded state to the folded state, and display the selected application on the second display.

According to various example embodiments, the processor may be configured to control the electronic device to split a screen of the first display into a plurality of regions, and to display the plurality of application in the plurality of regions, respectively.

According to various example embodiments, the at least one sensor may include at least one of an acceleration sensor, a gyro sensor, or a magnet sensor.

According to various example embodiments, the processor may be configured to control the electronic device to provide a plurality of indications respectively corresponding to the plurality of applications or a list of the plurality of applications through the second display in the folded state, to receive the input through the plurality of indications or the application list, and to select one of the plurality of applications based on the received input.

According to various example embodiments, the priorities may be determined, based on at least one of a setting value of each application, attribute information of each application, focus information, or history information.

According to various example embodiments, in order to determine the setting value of each application, the processor may be configured to control the electronic device to provide a list of the plurality of applications through the first display in the unfolded state, to receive an input of selecting at least one application in the application list, and to assign a high priority to the selected at least one application.

According to various example embodiments, in order to determine the attribute information of each application, the processor may be configured to identify whether each application is resizable, and to assign a high priority to an application which is resizable.

According to various example embodiments, in order to determine the focus information, the processor 120 may be configured to determine a focused application, based on an input or a characteristic of the application.

According to various example embodiments, the processor may be configured to control the electronic device to display, through the first display, the focused application to be distinguished from other applications among the plurality of application, based on the focus information.

According to various example embodiments, in order to determine the history information, the processor may be configured to identify at least one of execution count or execution time of each application executed through the second display, and to determine an score of each application, based on the identified at least one of execution count or execution time.

According to various example embodiments of the disclosure, a method for controlling and operating a plurality of displays of an electronic device including a foldable housing may include: displaying a plurality of applications on a first display in an unfolded state; selecting at least one of the plurality of applications, based on an input or priorities of the plurality of applications, based on at least one sensor detecting that the foldable housing is changed from the unfolded state to a folded state; and displaying the selected application on a second display.

According to various example embodiments, the method may further include providing a plurality of indications respectively corresponding to the plurality of applications or a list of the plurality of applications through the second display in the folded state; receiving the input through the plurality of indications or the application list; and selecting one of the plurality of applications, based on the received input.

According to various example embodiments, the priorities may be determined, based on a setting value of each application, and the method may further include, in order to determine the setting value of each application, providing a list of the plurality of applications through the first display in the unfolded state; receiving an input of selecting at least one application in the application list; and assigning a high priority to the selected at least one application.

According to various example embodiments, the priorities may be determined, based on attribute information of each application, and the method may further include, in order to determine the attribute information of each application, identifying whether each application is resizable; and assigning a high priority to an application which is resizable.

According to various example embodiments, the priorities may be determined, based on focus information, and the method may further include, in order to determine the focus information, determining a focused application, based on an input or a characteristic of the application.

According to various example embodiments, the priorities may be determined, based on history information, and the method may further include, in order to determine the history information, identifying at least one of execution count or execution time of each application executed through the second display; and determining a score of each application, based on the identified at least one of execution count or execution time.

According to various example embodiments of the disclosure, an electronic device may include a first display capable of changing a display structure; a second display; at least one sensor; and a processor configured to control the electronic device to display at least one application through the first display in a state where the display state is in a first state, to identify a change of the display state through the at least one sensor, to detect a predefined input within a predetermined time from a time point at which the display state is changed to a second state, and to display the at least one application through the second display, based on the predefined input.

According to various example embodiments, the processor may be further configured to control the electronic device to operate the second display in a power saving mode or an always-on-display (AOD) mode in response to identifying the change of the display structure.

According to various example embodiments, the processor may be further configured to maintain an execution of the at least one application for a specific time from the time point when the display structure is changed to the second structure.

According to various example embodiments, the processor may be further configured to detect the predefined input after the predetermined time from the time point at which the display state is changed to a second state, and to display a lock screen or an idle screen through the second display, based on the predefined input.

While the disclosure has been illustrated and described with reference to various example embodiments thereof, it will be understood that the various example embodiments are intended to be illustrative, not limiting. One or ordinary skill in the art will understand that various changes in form and detail may be made without departing from the true spirit and full scope of the disclosure, including the appended claims and their equivalents.

What is claimed is:

1. An electronic device comprising:
   a foldable housing including:
      a hinge;
      a first housing connected to the hinge, the first housing including a first surface facing a first direction and a second surface facing a second direction opposite the first direction; and
      a second housing connected to the hinge and configured to be foldable with the first housing around the hinge, the second housing including a third surface facing a third direction and a fourth surface facing a fourth direction opposite the third direction,
      wherein the first surface faces the third surface in a folded state, and the third direction is equal to the first direction in an unfolded state;
   a first display extending from the first surface to the third surface to define the first and third surfaces;
   a second display viewable through at least a part of the second or fourth surface;
   at least one sensor;
   a processor disposed in the first housing or the second housing; and
   a memory operatively connected to the processor,
   wherein the memory stores instructions which, when executed, cause the processor to control the electronic device to:
      simultaneously display a plurality of application screens corresponding to a plurality of applications being executed by the electronic device on the first surface and the third surface of the first display in the unfolded state, wherein each of the application screens displayed on the first surface and the third surface is included in the plurality of application screens;
      based on the at least one sensor detecting that the foldable housing is changed from the unfolded state to the folded state, simultaneously display, on the second display, a plurality of indications respectively corresponding to each of the plurality of application screens displayed on the first surface and the third surface, wherein the plurality of indications are displayed on the second display such that location, size and shape of the indications correspond to location, size and shape of the respective plurality of application screens displayed on the first surface and the third surface of the first display;
      receive an input selecting one of the displayed plurality of indications displayed on the second display; and
      based on receiving the input, simultaneously display, on a portion of the second display displaying the plurality of indications before the input is received, an application screen of an executing application corresponding to the selected indication and a selection region including information about each of the applications corresponding to the plurality of indications that are not selected by the input and without including information about the selected indication.

2. The electronic device of claim 1, wherein the processor is configured to control the electronic device to:
   split a screen of the first display into a plurality of regions, and
   display the plurality of application screens in the plurality of regions, respectively.

3. The electronic device of claim 1, wherein the at least one sensor includes at least one of an acceleration sensor, a gyro sensor, or a magnet sensor.

4. The electronic device of claim 1, wherein, in the unfolded state, one of the application screens of the plurality of application screens is displayed on the first surface and a portion of the third surface and at least two application screens of the plurality of application screens are displayed on only the third surface.

5. The electronic device of claim 1, wherein the processor is configured to control the electronic device to: select at least one of the plurality of applications based on priorities of the plurality of applications and display an application screen of the selected application based on the priority on the second display, and wherein the plurality of application are assigned priorities based on at least one of a setting value of each application, attribute information of each application, focus information, or history information.

6. The electronic device of claim 5, wherein the processor is configured to control the electronic device to:
   provide an application list of the plurality of applications through the first display in the unfolded state,
   receive an input of selecting at least one application in the application list, and
   assign a high priority to the selected at least one application.

7. The electronic device of claim 5, wherein the processor is configured to:
   identify whether each application screen is resizable, and
   assign a high priority to an application screen which is resizable.

8. The electronic device of claim 5, wherein the processor is configured to:
   determine a focused application, based on an input or a characteristic of the application.

9. The electronic device of claim 8, wherein the processor is configured to control the electronic device to display, through the first display, an application screen of the focused application to be distinguished from application screens of other applications among the plurality of application, based on the focus information.

10. The electronic device of claim 5, wherein the processor is configured to:
    identify at least one of execution count or execution time of each application executed through the second display, and
    determine a score of each application based on the identified at least one of execution count or execution time.

11. A method for controlling and operating a plurality of displays of an electronic device including a foldable housing, a hinge, a first housing connected to the hinge, the first housing including a first surface facing a first direction and a second surface facing a second direction opposite the first direction; and a second housing connected to the hinge and configured to be foldable with the first housing around the hinge, the second housing including a third surface facing a third direction and a fourth surface facing a fourth direction opposite the third direction, wherein the first surface faces the third surface in a folded state, and the third direction is equal to the first direction in an unfolded state, a first display extending from the first surface to the third surface to define the first and third surfaces, and a second display viewable through at least a part of the second or fourth surface, the method comprising:

simultaneously displaying a plurality of application screens corresponding to a plurality of applications being executed by the electronic device on the first surface and the third surface of the first display in the unfolded state of the electronic device, wherein each of the application screens displayed on the first surface and the third surface is included in the plurality of application screens;

based on at least one sensor detecting that the foldable housing is changed from the unfolded state to a folded state, simultaneously displaying, on the second display, a plurality of indications respectively corresponding to each of the plurality of application screens displayed on the first surface and the third surface, wherein the plurality of indications are displayed on the second display such that location, size and shape of the indications correspond to location, size and shape of the respective plurality of application screens displayed on the first surface and the third surface of the first display;

receiving an input selecting one of the displayed plurality of indications displayed on the second display; and based on receiving the input, simultaneously displaying, on a portion of the second display displaying the plurality of indications before the input is received, an application screen of an executing application corresponding to the selected indication and a selection region including information about each of the applications corresponding to the plurality of indications that are not selected by the input and without including information about the selected indication.

12. The method of claim 11, wherein, in the unfolded state, one of the application screens of the plurality of application screens is displayed on the first surface and a portion of the third surface and at least two application screens of the plurality of application screens are displayed on only the third surface.

13. The method of claim 11, wherein the plurality of applications are assigned priorities based on a setting value of each application, and wherein the method further comprises:

displaying an application screen of one of the plurality of applications on the second display based on the priorities of the plurality of applications;

providing an application list of the plurality of applications through the first display in the unfolded state;

receiving an input of selecting at least one application in the application list; and assigning a high priority to the selected at least one application.

14. The method of claim 11, wherein the plurality of applications are assigned priorities based on attribute information of each application, and wherein the method further comprises:

displaying an application screen of one of the plurality of applications on the second display based on the priorities of the plurality of applications;

identifying whether each application screen is resizable; and assigning a high priority to an application screen which is resizable.

15. The method of claim 11, wherein the plurality of applications are assigned priorities based on focus information, and wherein the method further comprises:

displaying an application screen of one of the plurality of applications on the second display based on the priorities of the plurality of applications; and determining a focused application based on an input or a characteristic of the application.

16. The method of claim 11, wherein the plurality of applications are assigned priorities based on history information, and wherein the method further comprises:

displaying an application screen of one of the plurality of applications on the second display based on the priorities of the plurality of applications;

identifying at least one of execution count or execution time of each application executed through the second display; and determining an score of each application, based on the identified at least one of execution count or execution time.

\* \* \* \* \*